(12) United States Patent
Guo et al.

(10) Patent No.: US 10,158,412 B2
(45) Date of Patent: Dec. 18, 2018

(54) METHOD, SYSTEM AND APPARATUS FOR INDICATING AND RECEIVING UPLINK BEAM INDEX

(71) Applicant: ZTE Corporation, Shenzhen (CN)

(72) Inventors: Senbao Guo, Shenzhen (CN); Guanghui Yu, Shenzhen (CN); Zhaohua Lu, Shenzhen (CN)

(73) Assignee: Xi'an Zhongxing New Software Co. Ltd., Xi'an (CN)

( * ) Notice: Subject to any disclaimer, the term of this patent is extended or adjusted under 35 U.S.C. 154(b) by 92 days.

(21) Appl. No.: 15/105,161

(22) PCT Filed: Jul. 17, 2014

(86) PCT No.: PCT/CN2014/082436
§ 371 (c)(1),
(2) Date: Aug. 24, 2016

(87) PCT Pub. No.: WO2015/090058
PCT Pub. Date: Jun. 25, 2015

(65) Prior Publication Data
US 2016/0359536 A1 Dec. 8, 2016

(30) Foreign Application Priority Data

Dec. 20, 2013 (CN) .......................... 2013 1 0719589

(51) Int. Cl.
*H04B 1/38* (2015.01)
*H04L 7/00* (2006.01)
(Continued)

(52) U.S. Cl.
CPC ........... *H04B 7/063* (2013.01); *H04B 7/0695* (2013.01); *H04W 72/042* (2013.01); *H04W 72/0413* (2013.01)

(58) Field of Classification Search
USPC ....... 375/219, 220, 221, 222, 295, 296, 297, 375/316, 324, 340, 346, 354, 356, 358,
(Continued)

(56) References Cited

U.S. PATENT DOCUMENTS 8,750,933 B2 * 6/2014 Song .................... H04B 7/0632
455/562.1
9,094,977 B2 * 7/2015 Li ....................... H04W 72/046
(Continued)

FOREIGN PATENT DOCUMENTS

CN 101615937 A 12/2009
CN 101626265 A 1/2010
(Continued)

OTHER PUBLICATIONS

International Search Report in international application No. PCT/CN2014/082436, dated Oct. 22, 2014.
(Continued)

*Primary Examiner* — Linda Wong
(74) *Attorney, Agent, or Firm* — Oppedahl Patent Law Firm LLC

(57) ABSTRACT

Provided are a method, system and apparatus for indicating and receiving an uplink beam index. The indicating method includes that: a base station detects a first uplink access signal of a terminal from at least one uplink access signal received from the terminal according to a preset rule; the base station acquires corresponding related information from the first uplink access signal; and the base station generates an access response indication by virtue of an uplink beam index corresponding to the first uplink access signal, and sends the access response indication.

6 Claims, 7 Drawing Sheets

(51) Int. Cl.
*H04B 7/00* (2006.01)
*H04B 7/06* (2006.01)
*H04W 72/04* (2009.01)

(58) Field of Classification Search
USPC .................................................. 375/364
See application file for complete search history.

(56) References Cited

U.S. PATENT DOCUMENTS

| | | | |
|---|---|---|---|
| 2008/0045153 A1 | 2/2008 | Surineni | |
| 2008/0218413 A1 | 9/2008 | Li | |
| 2013/0040684 A1 | 2/2013 | Yu | |
| 2013/0102345 A1* | 4/2013 | Jung | H04B 7/0456 455/513 |
| 2013/0272220 A1* | 10/2013 | Li | H04W 72/046 370/329 |
| 2014/0010178 A1* | 1/2014 | Yu | H04W 74/0833 370/329 |
| 2014/0177607 A1* | 6/2014 | Li | H04B 7/0617 370/336 |
| 2015/0208443 A1* | 7/2015 | Jung | H04B 7/0617 370/329 |

FOREIGN PATENT DOCUMENTS

| | | |
|---|---|---|
| CN | 101689901 A | 3/2010 |
| CN | 102026341 A | 4/2011 |
| CN | 102326339 A | 1/2012 |
| CN | 102396164 A | 3/2012 |
| CN | 103201964 A | 7/2013 |
| WO | 2013022292 A2 | 2/2013 |

OTHER PUBLICATIONS

English Translation of the Written Opinion of the International Search Authority in international application No. PCT/CN2014/082436, dated Oct. 22, 2014.

Z Pi, F Khan, "A millimeter-wave massive MIMO system for next generation mobile broadband", Signals, Systems & Computers, 2012 :693-698.

* cited by examiner

METHOD, SYSTEM AND APPARATUS FOR INDICATING AND RECEIVING UPLINK BEAM INDEX

TECHNICAL FIELD

The present disclosure relates to the field of mobile communications, and in particular to a method, system and apparatus for indicating an uplink beam index.

BACKGROUND

During high-frequency communication, adoption of a higher carrier frequency for transmission may cause average path loss much higher than that of a conventional Long Term Evolution (LTE) system. An LTE system is needed to have area coverage which maximally reaches 100 km. If the maximum coverage is reached, the area coverage of high-frequency communication may maximally reach 1 km if only average path loss is considered. However, if high air absorption, sensitivity to shadow fading and other features of an actual high-frequency carrier are considered, actually supported coverage is smaller than 1 km. If high-frequency communication supports maximum coverage of 1 km, a Signal to Interference plus Noise Radio (SINR) different from that of an LTE system may be obtained within the same coverage area, and a signal to noise ratio of the former is at least 20 dB lower than that of the latter. In order to ensure that high-frequency communication and the LTE system have an approximate SINR within the same coverage, it is needed to ensure accommodation of more antennae per unit area.

Accommodation of more antennae means that beamforming may be adopted to ensure coverage of high-frequency communication. From an early design concept of LTE, it is needed to accurately obtain channel state information to obtain a beamforming weight from the channel state information, thereby achieving a good beamforming effect. In order to obtain a better beamforming weight, for a base station on a sending end, a terminal on a receiving end is needed to feed back downlink channel state information or a weight; while for the receiving end, the base station on the sending end is needed to feed back uplink channel state information or a weight, so that it is guaranteed that the base station may send a downlink service using an optimal beam and the terminal may also send an uplink service using an optimal beam. The base station cannot cover the receiving end by virtue of the optimal beam before obtaining the weight, so that a reference signal sent by the base station cannot be measured by the receiving end; or even though the base station covers the terminal, the terminal cannot achieve the same coverage as the base station, and a fed-back content cannot be acquired by the base station, so that selection of a beamforming weight and normal communication are also impossible.

SUMMARY

In view of this, the embodiments of the present disclosure provide a method, system and apparatus for indicating and receiving an uplink beam index, which may ensure reliability of data transmission and ensure optimal transmission performance.

In order to achieve the purpose, the technical solutions of the present disclosure are implemented as follows.

An embodiment of the present disclosure provides a method for indicating an uplink beam index, which may include that:

a base station detects a first uplink access signal of a terminal from at least one uplink access signal received from the terminal according to a preset rule;

the base station acquires corresponding related information from the first uplink access signal; and the base station generates an access response indication by virtue of an uplink beam index corresponding to the first uplink access signal, and sends the access response indication.

An embodiment of the present disclosure further provides a method for receiving an uplink beam index, which may include that:

a terminal sends at least one uplink access signal, wherein the at least one uplink access signal may include related information of the at least one uplink access signal;

and the terminal determines an uplink beam index corresponding to a first uplink access signal according to a received access response indication.

An embodiment of the present disclosure further provides a method for indicating and receiving an uplink beam index, which may include that:

a terminal sends at least one uplink access signal to a base station, wherein the at least one uplink access signal may include related information of the at least one uplink access signal;

the base station detects a first uplink access signal of the terminal from the at least one uplink access signal received from the terminal according to a preset rule;

the base station acquires corresponding related information from the first uplink access signal, generates an access response indication by virtue of an uplink beam index corresponding to the first uplink access signal, and sends the access response indication; and the terminal determines the uplink beam index corresponding to the first uplink access signal selected by the base station according to the received access response indication.

An embodiment of the present disclosure further provides a base station, which may include: a transceiver unit and a processing unit, wherein the processing unit may be configured to detect a first uplink access signal of a terminal from at least one uplink access signal received from the terminal according to a preset rule, acquire corresponding related information from the first uplink access signal and generate an access response indication by virtue of an uplink beam index corresponding to the first uplink access signal; and the transceiver unit may be configured to send the access response indication.

An embodiment of the present disclosure further provides a terminal, which may include: a transceiver unit and a processing unit, wherein the transceiver unit may be configured to send at least one uplink access signal, the at least one uplink access signal including related information of the at least one uplink access signal, and send a received access response indication to the processing unit; and the processing unit may be configured to determine an uplink beam index corresponding to a first uplink access signal selected by a base station according to the received access response indication.

An embodiment of the present disclosure further provides a system for indicating and receiving an uplink beam index, which may include: a terminal and a base station, wherein the terminal may be the terminal in the abovementioned solution; and the base station may be the base station in the abovementioned solution.

According to the method, system and apparatus for indicating and receiving an uplink beam index, as provided by the embodiments of the present disclosure, a first uplink access signal of a terminal may be selected from at least one uplink access signal received from the terminal according to a preset rule; a base station acquires corresponding related information from the first uplink access signal; and an access response indication is generated by virtue of an uplink beam index corresponding to the first uplink access signal, and the access response indication is sent. Therefore, the base station may acquire an optimal uplink access signal and indicate the same to a corresponding uplink beam of the terminal to ensure reliability of data transmission and ensure optimal transmission performance.

DETAILED DESCRIPTION

The present disclosure will be further described below with reference to the drawings and specific embodiments in detail.

Embodiment 1

Figure 1:
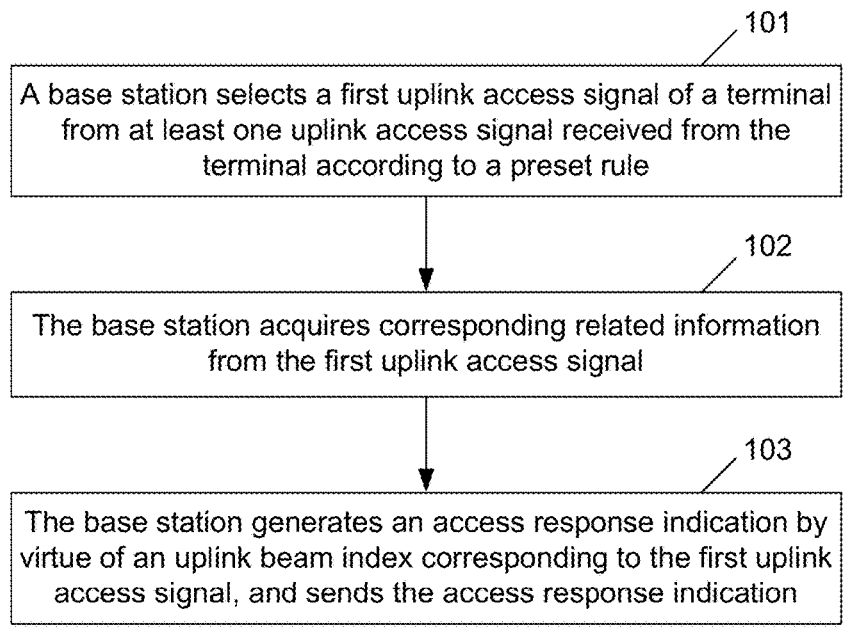
FIG. 1 is an operation flowchart of a base station in a method for indicating an uplink beam index according to an embodiment of the present disclosure.

An operation flow of a base station in a method for indicating an uplink beam index disclosed by an embodiment of the present disclosure, as shown in FIG. 1, includes:

Step 101: a base station selects a first uplink access signal of a terminal from at least one uplink access signal received from the terminal according to a preset rule;

Step 102: the base station acquires corresponding related information from the first uplink access signal; and Step 103: the base station generates an access response indication by virtue of an uplink beam index corresponding to the first uplink access signal, and sends the access response indication.

Here, the preset rule may include that: the base station detects an uplink access signal with optimal uplink access signal quality to obtain a beam index, or the base station detects an uplink access signal with a highest peak value of related power to obtain a beam index, or the like.

The access response indication is generated in at least one of the following manners:

an uplink beam index is introduced into Downlink Control Information (DCI) corresponding to the access response indication, wherein the uplink beam index is an index corresponding to an uplink beam adopted by the terminal when the at least one uplink access signal is sent, and the uplink beam index is index information generated to indicate the uplink beam;

a CRC bit sequence of DCI is scrambled by virtue of a DCI CRC scrambling sequence corresponding to the uplink beam index;

a DCI bit sequence is scrambled by virtue of a DCI scrambling sequence corresponding to the uplink beam index;

a DCI bit sequence and a DCI CRC bit sequence are scrambled by virtue of a DCI and DCI CRC scrambling sequence corresponding to the uplink beam index;

a data information CRC bit sequence is scrambled by virtue of a data information CRC scrambling sequence corresponding to the uplink beam index;

a data information bit sequence is scrambled by virtue of a data information scrambling sequence corresponding to the uplink beam index;

a data information bit sequence and a data information CRC bit sequence are scrambled by virtue of data information and a CRC scrambling sequence of the data information corresponding to the uplink beam index;

a bit used to indicate an index corresponding to an uplink beam is added into the data information; and the uplink beam index is indicated by virtue of a time-domain and/or frequency-domain resource where the DCI corresponding to the uplink beam index is located.

Preferably, the related information includes at least one of the following information: a time-domain position index of the first uplink access signal; a frequency-domain position index of the first uplink access signal; a sequence index of the first uplink access signal; an uplink-beam-index indication bit, namely an indication bit of an uplink beam index, contained after the first uplink access signal; and an index corresponding to a beam identification sequence contained after the first uplink access signal.

Preferably, before Step 101 is executed, the base station may also preset setting information for receiving at least one uplink access signal, the setting information meeting at least one of the following conditions: at least one time-domain position of the at least one uplink access signal; at least one frequency domain of the at least one uplink access signal; at least one available sequence of the at least one uplink access signal; at least one uplink-beam-index indication bit after the at least one uplink access signal; and at least one beam identification sequence after the at least one uplink access signal.

In a predefined manner, at least one of the following information is specified to be the same for the terminal and the base station:

a corresponding relationship between at least one time-domain position of at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

Preferably, the base station may also configure a system message to configure configuration information for the terminal to send an uplink access signal, and the configuration information for sending an uplink access signal includes at least one of the following information: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one available sequence of at least one beam identification sequence after the at least one uplink access signal.

The base station may further configure at least one of the following information of the terminal in the manner of configuring a system message: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

Embodiment 2

Figure 2:
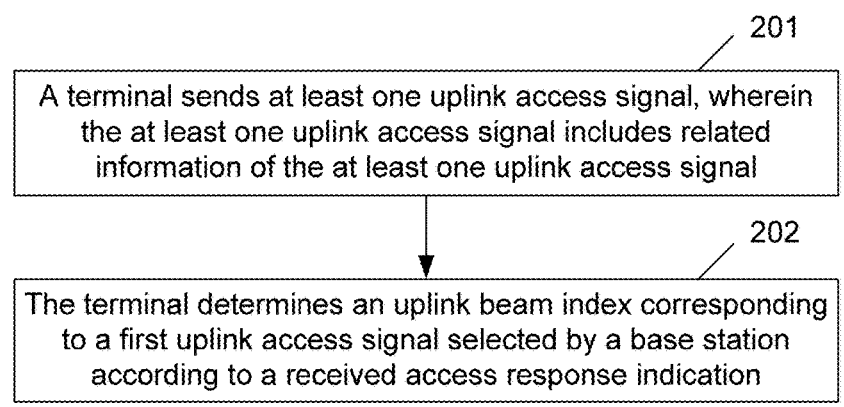
FIG. 2 is an operation flowchart of a terminal in a method for receiving an uplink beam index according to an embodiment of the present disclosure.

An embodiment of the present disclosure discloses an operation flow of a terminal in a method for receiving an uplink beam index, which, as shown in FIG. 2, includes:

Step 201: a terminal sends at least one uplink access signal, wherein the at least one uplink access signal includes related information of the at least one uplink access signal; and Step 202: the terminal determines an uplink beam index corresponding to a first uplink access signal selected by a base station according to a received access response indication.

Here, the terminal contains the related information of each uplink access signal in each uplink access signal to represent the beam characteristic of the each uplink access signal.

A preset rule may include that the base station detects an uplink access signal with optimal uplink access signal quality to obtain a beam indexe, or the base station detects an uplink access signal with a highest peak value of related power to obtain a beam indexe, or the like.

At least one of the following manners may be adopted for determining the first uplink access signal selected by the base station according to the received access response indication:

the first uplink access signal is determined according to an uplink-beam-index indication bit in DCI corresponding to the access response indication, wherein the uplink beam index is an index corresponding to an uplink beam adopted by the terminal when the at least one uplink access signal is sent;

the first uplink access signal is determined according to an uplink-beam-index indication bit in DCI corresponding to the access response indication, wherein the uplink beam index is an index corresponding to an uplink beam adopted by the terminal when the at least one uplink access signal is sent;

the first uplink access signal is determined according to a DCI CRC scrambling sequence corresponding to the access response indication;

the first uplink access signal is determined according to a DCI scrambling sequence corresponding to the access response indication;

the first uplink access signal is determined according to a DCI and DCI CRC scrambling sequence corresponding to the access response indication;

the first uplink access signal is determined according to a data information CRC scrambling sequence corresponding to the access response indication;

the first uplink access signal is determined according to a data information scrambling sequence corresponding to the access response indication;

the first uplink access signal is determined according to a data information and data information CRC scrambling sequence corresponding to the access response indication;

the first uplink access signal is determined according to a bit of data information corresponding to the access response indication; and the first uplink access signal is determined according to a time-domain and/or frequency-domain resource where the DCI in the access response indication is located.

Preferably, the related information of the at least one uplink access signal includes at least one of the following information:

1. at least one time-domain position of the at least one uplink access signal;

2. at least one frequency-domain position of the at least one uplink access signal;

3. at least one sequence of the at least one uplink access signal;

4. at least one uplink-beam-index indication bit contained after the at least one uplink access signal; and 5. at least one beam identification sequence contained after the at least one uplink access signal.

Preferably, the terminal presets configuration information of the at least one uplink access signal in a predefined manner, including at least one of the following information:

1. at least one time-domain position of the at least one uplink access signal;
2. at least one frequency-domain position of the at least one uplink access signal;
3. at least one available sequence of the at least one uplink access signal;
4. at least one uplink-beam-index indication bit after the at least one uplink access signal; and
5. at least one available sequence of at least one beam identification sequence after the at least one uplink access signal.

Based on claim 7, a consistent specification is made for the terminal and the base station about at least one of the following information in the predefined manner:

1. a corresponding relationship between at least one time-domain position of the at least one uplink access signal and at least one uplink beam index;
2. a corresponding relationship between at least one frequency-domain position of the at least one uplink access signal and at least one uplink beam index;
3. a corresponding relationship between at least one available sequence of the at least one uplink access signal and at least one uplink beam index;
4. a corresponding relationship between at least one uplink-beam-index indication bit after the at least one uplink access signal and at least one uplink beam index; and
5. a corresponding relationship between at least one available sequence of at least one beam identification sequence after the at least one uplink access signal and at least one uplink beam index.

Preferably, before Step 201 is executed, the terminal receives a system message and extracts at least one of the following information from the system message: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one beam identification sequence after the at least one uplink access signal.

Or, before Step 201 is executed, the terminal receives a system message and extracts at least one of the following information from the system message: a corresponding relationship between the at least one time-domain position of the at least one uplink access signal and at least one uplink beam index; a corresponding relationship between the at least one frequency-domain position of the at least one uplink access signal and at least one uplink beam index; a corresponding relationship between the at least one available sequence of the at least one uplink access signal and at least one uplink beam index; a corresponding relationship between the at least one uplink-beam-index indication bit after the at least one uplink access signal and at least one uplink beam index; and a corresponding relationship between at least one available sequence of at least one beam identification sequence after the at least one uplink access signal and at least one uplink beam index.

Embodiment 3

Figure 3:
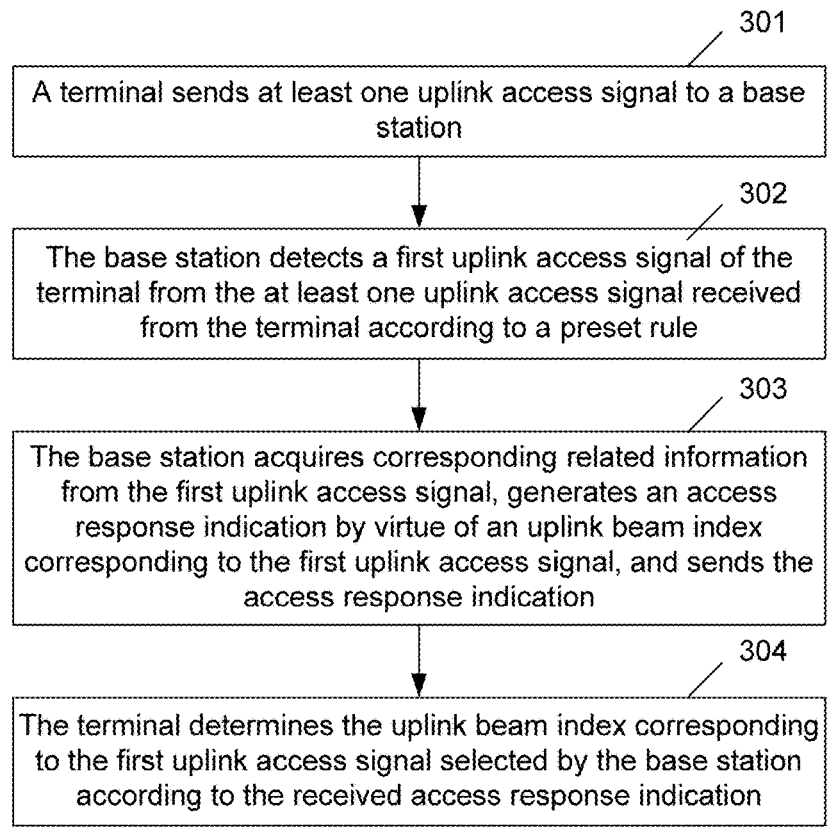
FIG. 3 is an operation flowchart of a terminal in a method for indicating and receiving an uplink beam index according to an embodiment of the present disclosure.
Figure 4:
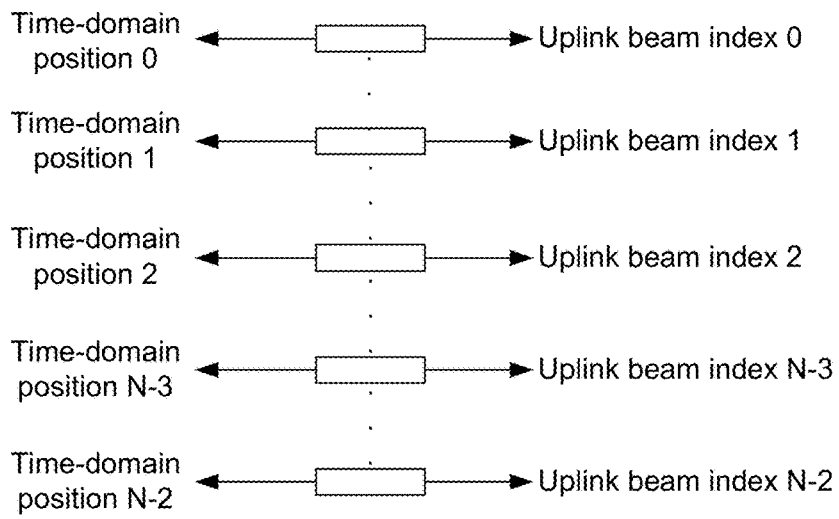
FIG. 4 is a flowchart of a method for indicating and receiving an uplink beam index according to an embodiment of the present disclosure.
Figure 5:
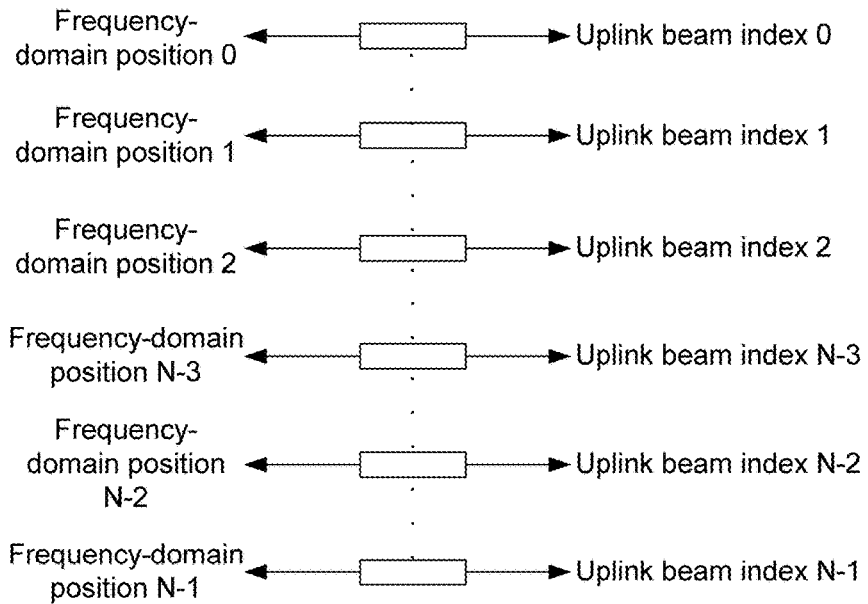
FIG. 5 is a diagram showing the use of a time-domain position index to correspond to an uplink beam index according to an embodiment of the present disclosure.

A method for indicating and receiving an uplink beam index provided by the present disclosure, as shown in FIG. 3, includes:

Step 301: a terminal sends at least one uplink access signal to a base station, wherein the at least one uplink access signal include related information of the at least one uplink access signal;

Step 302: the base station detects a first uplink access signal of the terminal from the at least one uplink access signal received from the terminal according to a preset rule;

Step 303: the base station acquires corresponding related information from the first uplink access signal, generates an access response indication by virtue of an uplink beam index corresponding to the first uplink access signal, and sends the access response indication; and Step 304: the terminal determines the uplink beam index corresponding to the first uplink access signal selected by the base station according to the received access response indication.

After Step 304, the terminal may send the at least one uplink access signal using a first uplink beam.

Embodiment 4

It is supposed that a base station sends downlink synchronization signals and/or downlink system information and/or downlink beam signals by virtue of N downlink beams; and a terminal detects the downlink synchronization signals and/or downlink system information and/or downlink beam signals sent through each beam, the terminal may obtain a synchronization signal and/or downlink system information and/or a downlink beam signal sent through a first downlink beam, and the terminal feeds back an index corresponding to an optimal downlink beam through an uplink access signal.

The terminal is needed to send the one or more uplink access signals by virtue of one or more uplink beams to ensure that the base station may correctly receive an uplink access signal sent by at least one uplink beam as much as possible. The terminal represents the one or more uplink access signals sent by virtue of different uplink beams through at least one of the following characteristics of the one or more uplink access signals.

The one or more uplink access signals have at least one of the following characteristics:

1. at least one time-domain position of at least one uplink access signal;
2. at least one frequency-domain position of at least one uplink access signal;
3. at least one available sequence of at least one uplink access signal;
4. at least one uplink-beam-index indication bit after at least one uplink access signal; and
5. at least one beam identification sequence after at least one uplink access signal.

The base station detects a first uplink access signal defined according to a certain criterion from the at least one uplink access signal received from the terminal, and then obtains an index of related information of the detected uplink access signal or a corresponding uplink beam index.

Related information of the uplink access signal includes:

1. the time-domain position of the detected uplink access signal;
2. the frequency-domain position of the detected uplink access signal;
3. the sequence of the detected uplink access signal;
4. the uplink-beam-index indication bit contained after the detected uplink access signal; and
5. the beam identification sequence contained after the detected uplink access signal.

After obtaining the index of related information corresponding to the first uplink access signal defined according to a certain criterion, the base station indicates the index of related information corresponding to the first uplink access signal to the terminal through an access response in at least one of the following manners that:

1. an indication of an uplink beam index is introduced into DCI corresponding to the access response;
2. an indication bit of an uplink beam index is introduced into DCI corresponding to an access response;
3. a DCI CRC bit sequence is scrambled by virtue of a DCI CRC scrambling sequence corresponding to an uplink beam index;
4. a DCI bit sequence is scrambled by virtue of a DCI scrambling sequence corresponding to an uplink beam index;
5. a DCI bit sequence and a DCI CRC bit sequence are scrambled by virtue of DCI and DCI CRC scrambling sequence corresponding to an uplink beam index;
6. a CRC bit sequence of data information bits is scrambled by virtue of a data information CRC scrambling sequence corresponding to an uplink beam index;
7. data information is scrambled by virtue of a data information scrambling sequence corresponding to an uplink beam index;
8. a bit sequence of data information and a CRC bit sequence of the data information are scrambled by virtue of data information and a CRC scrambling sequence of the data information corresponding to an uplink beam index;
9. a bit is added into data information to indicate a corresponding index; and
10. an index of an uplink beam is indicated by virtue of a time-domain and/or frequency-domain resource where DCI corresponding to the uplink beam index is located.

The terminal obtains an index of related information of an optimal uplink access signal, as indicated by the base station, in at least of the following detection manners.

The detection manners include that:

1. an uplink beam index indication in DCI corresponding to the access response is detected;
2. an uplink-beam-index indication bit in DCI corresponding to the access response is detected;
3. a DCI CRC scrambling sequence in the DCI corresponding to the access response is detected;
4. a DCI scrambling sequence in the DCI corresponding to the access response is detected;
5. a DCI and CRC scrambling sequence in the DCI corresponding to the access response is detected;
6. a data information CRC scrambling sequence corresponding to the access response is detected;
7. a data information scrambling sequence corresponding to the access response is detected;
8. a data information and data information CRC scrambling sequence corresponding to the access response is detected;
9. a data information bit corresponding to the access response is detected; and
10. a time-domain and/or frequency-domain resource where DCI is located is detected.

After obtaining the index of related information of the optimal uplink access signal, indicated by the base station, the terminal may obtain a corresponding uplink beam according to the index of related information of the uplink access signal (the terminal knows the uplink beam adopted for sending each uplink access signal corresponding to the index of related information of the uplink access signal), so that the terminal may send uplink data and control information to the base station by virtue of the first uplink beam.

Sub-Embodiment 1

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the amount of included time units. Here, the duration levels may also be time-domain repeat levels of the uplink access signals.

TABLE 1

| Uplink beam index | Time-domain position of uplink access signal |
| --- | --- |
| 0 | Time-domain position 0 |
| 1 | Time-domain position 1 |
| ... | ... |
| N − 1 | Time-domain position N − 1 |

The terminal detects downlink signals to obtain an index of a first downlink beam, and feeds back the downlink beam by virtue of uplink access signals. The terminal is needed to send the uplink access signals by virtue of multiple uplink beams to ensure that the base station may correctly receive the uplink access signals.

The base station detects the uplink access signals at time-domain positions of multiple uplink access signals, and after the base station detects an uplink access signal with optimal quality at time-domain position x ($0 \leq x \leq N-1$) of the uplink access signal, the base station indicates an index of the time-domain position of the uplink access signal through an access response, so that the terminal may send uplink data and control information to the base station by virtue of the first uplink beam. An indication method is that the base station introduces an index indication bit of the time-domain position of the uplink access signal into DCI corresponding to the access response, and the terminal detects the index indication bit of the time-domain position of the uplink access signal to obtain time-domain position index x, indicated by the base station, of the uplink access signal, thereby obtaining a corresponding optimal uplink beam according to preset information; and therefore, the terminal may send the uplink data and the control information to the base station by virtue of the first uplink beam.

Sub-Embodiment 2

It is supposed that the base station and the terminal predefine N time-domain positions of uplink access signals. Or, the base station configures the N time-domain positions of the uplink access signals to the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

Figure 6:
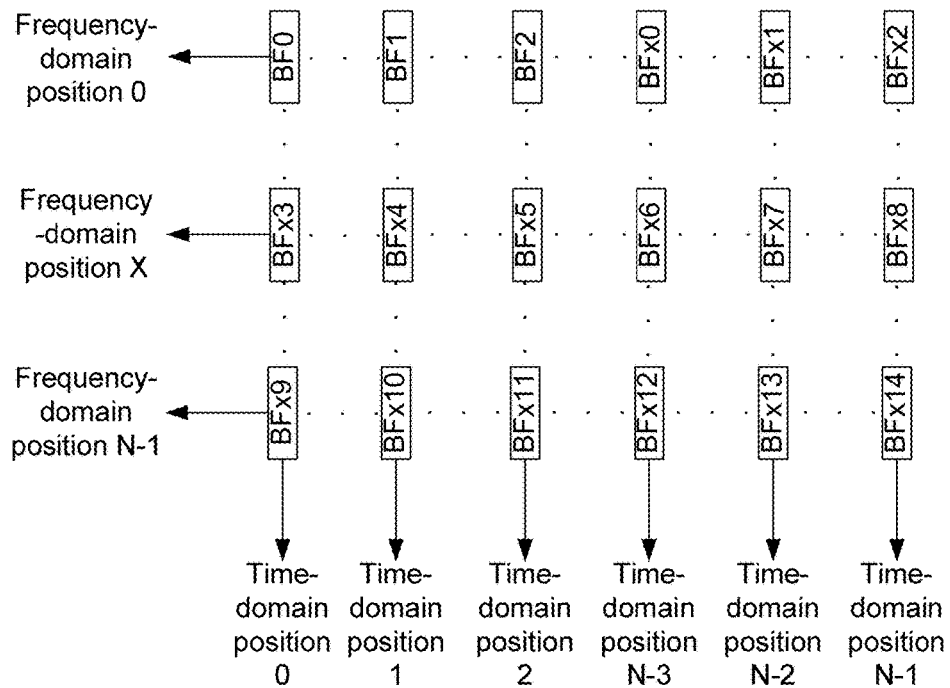
FIG. 6 is a diagram showing the use of a frequency-domain position index to correspond to an uplink beam index according to an embodiment of the present disclosure.

The base station detects the uplink access signals at time-domain positions of multiple uplink access signals, and after the base station detects an uplink access signal with optimal quality at time-domain position x ($0 \leq x \leq N-1$) of the uplink access signal, the base station indicates an index of the time-domain position of the uplink access signal through an access response, so that the terminal may send uplink data and control information to the base station by virtue of the first uplink beam. An indication method is that the base station introduces a DCI CRC scrambling bit sequence into DCI corresponding to the access response, and as shown in FIG. 6, multiple DCI CRC scrambling bits may correspond to indexes of multiple time-domain position indexes of uplink access signals and the DCI CRC scrambling bits are bit sequences formed by "0" and "1". As shown in Table 2, the terminal obtains the index of the time-domain position of the uplink access signal by detecting the CRC scrambling bit sequence, thereby obtaining the corresponding optimal uplink beam according to preset information; and therefore, the terminal may send the uplink data and the control information to the base station by virtue of the first uplink beam.

TABLE 2

| DCI CRC scrambling bit sequence | Time-domain position of uplink access signal |
| --- | --- |
| DCI CRC scrambling bit sequence 0 | Time-domain position 0 of uplink access signal |
| DCI CRC scrambling bit sequence 1 | Time-domain position 1 of uplink access signal |
| ... | ... |
| DCI CRC scrambling bit sequence N − 1 | Time-domain position N − 1 of uplink access signal |

Sub-Embodiment 3

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

Figure 7:
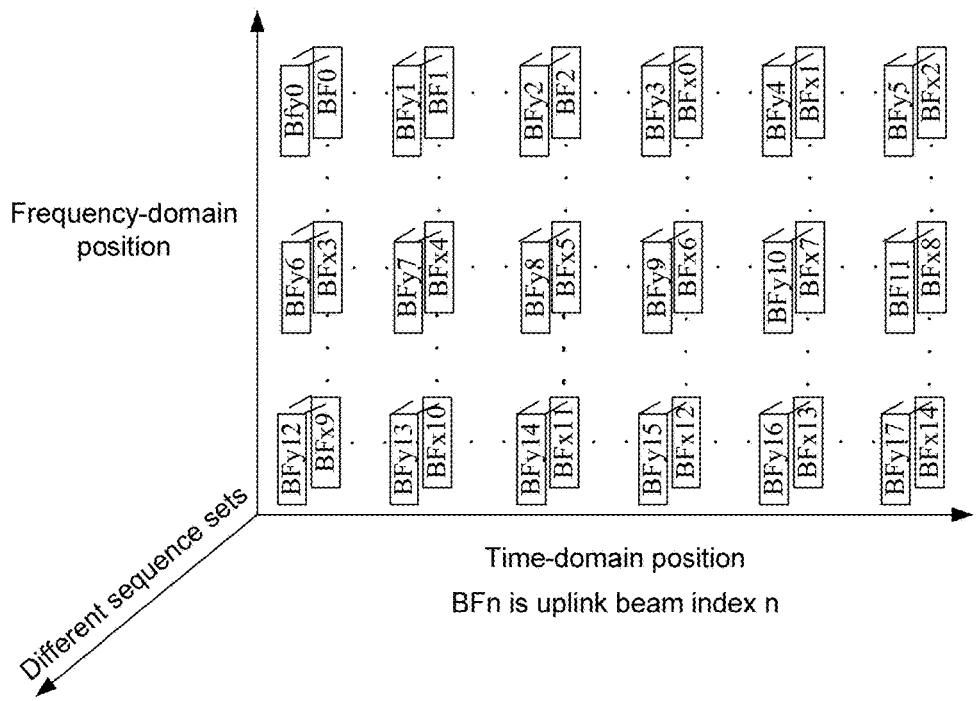
FIG. 7 is a diagram showing the use of a time-domain and frequency-domain position joint index to correspond to an uplink beam index according to an embodiment of the present disclosure.

The base station detects the uplink access signals at multiple time-domain positions of uplink access signals, and after the base station detects an uplink access signal with optimal quality at time-domain position x ($0 \leq x \leq N-1$) of the uplink access signal, the base station indicates an index of the time-domain position of the uplink access signal through an access response, so that the terminal may send uplink data and control information to the base station by virtue of the first uplink beam. An indication method is that the base station introduces a DCI scrambling bit sequence into DCI corresponding to the access response, and as shown in FIG. 7, multiple DCI scrambling bits may correspond to indexes of multiple time-domain positions of uplink access signals and the DCI scrambling bits are bit sequences formed by "0" and "1". As shown in Table 3, the terminal detects the DCI scrambling bit sequence to obtain the index of the time-domain position of the uplink access signal, thereby obtaining the corresponding optimal uplink beam according to preset information; and therefore, the terminal may send the uplink data and the control information to the base station by virtue of the first uplink beam.

TABLE 3

| DCI scrambling bit sequence | Time-domain position of uplink access signal |
| --- | --- |
| DCI scrambling bit sequence 0 | Time-domain position 0 of uplink access signal |
| DCI scrambling bit sequence 1 | Time-domain position 1 of uplink access signal |
| ... | ... |
| DCI scrambling bit sequence N − 1 | Time-domain position N − 1 of uplink access signal |

Sub-Embodiment 4

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

Figure 8:
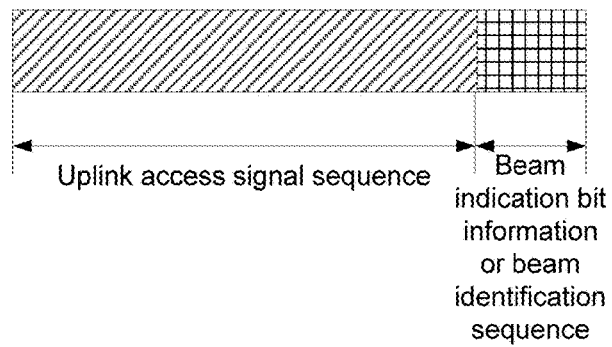
FIG. 8 is a diagram showing the use of a time-domain and frequency-domain position joint sequence set index to correspond to an uplink beam index according to an embodiment of the present disclosure.

The base station detects the uplink access signals at time-domain positions of multiple uplink access signals, and after the base station detects an uplink access signal with optimal quality at time-domain position x ($0 \leq x \leq N-1$) of the uplink access signal, the base station indicates an index of the time-domain position of the uplink access signal through an access response, so that the terminal may send uplink data and control information to the base station by virtue of the first uplink beam. An indication method is that the base station introduces a DCI and DCI CRC scrambling bit sequence into DCI corresponding to the access response, and as shown in FIG. 8, multiple DCI and DCI CRC scrambling bits may correspond to multiple time-domain position indexes of uplink access signals and the DCI and DCI CRC scrambling bits are bit sequences formed by "0" and "1". As shown in Table 4, the terminal detects the DCI and DCI CRC scrambling bit sequence to obtain the index of the time-domain position of the uplink access signal, thereby obtaining the corresponding optimal uplink beam according to preset information; and therefore, the terminal may send the uplink data and the control information to the base station by virtue of the first uplink beam.

TABLE 4

| DCI and DCI CRC scrambling bit sequence | Time-domain position of uplink access signal |
| --- | --- |
| DCI and DCI CRC scrambling bit sequence 0 | Time-domain position 0 of uplink access signal |
| DCI and DCI CRC scrambling bit sequence 1 | Time-domain position 1 of uplink access signal |
| ... | ... |
| DCI and DCI CRC scrambling bit sequence N − 1 | Time-domain position N − 1 of uplink access signal |

Sub-Embodiment 5

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

Figure 9:
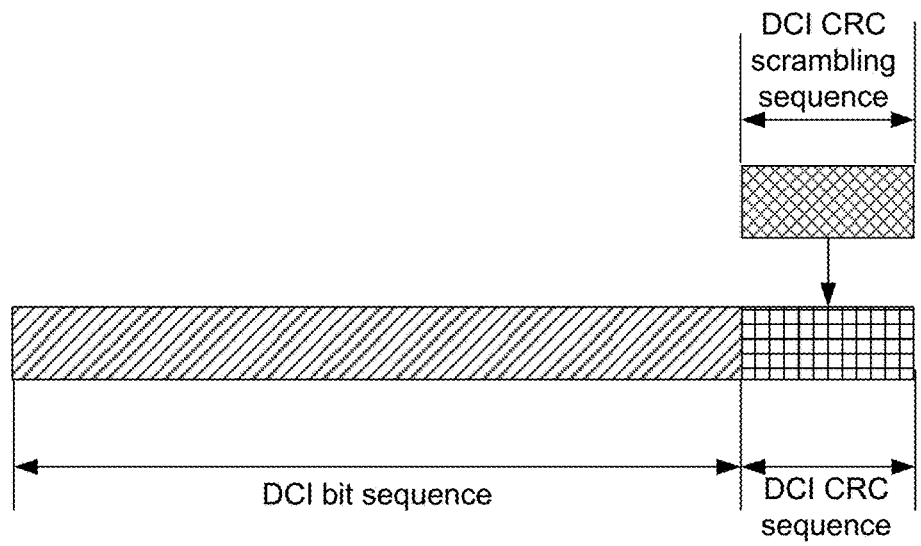
FIG. 9 is a diagram showing the use of a beam identification sequence or an indication bit of an uplink access signal to correspond to an uplink beam index according to an embodiment of the present disclosure.

The base station detects the uplink access signals at multiple time-domain positions of uplink access signals, and after the base station detects an uplink access signal with optimal quality at time-domain position x (0≤x≤N−1) of the uplink access signal, the base station indicates an index of the time-domain position of the uplink access signal through an access response, so that the terminal may send uplink data and control information to the base station by virtue of the first uplink beam. An indication method is that the base station introduces a data information CRC scrambling bit sequence into data information corresponding to the access response, and as shown in FIG. 9, multiple data information CRC scrambling bits may correspond to multiple time-domain position indexes of uplink access signals and the data information CRC scrambling bits are bit sequences formed by "0" and "1". As shown in Table 5, the terminal detects the data information CRC scrambling bit sequence to obtain the index of the time-domain position of the uplink access signal, thereby obtaining the corresponding optimal uplink beam according to preset information; and therefore, the terminal may send the uplink data and the control information to the base station by virtue of the first uplink beam.

TABLE 5

| Data information CRC scrambling bit sequence | Time-domain position of uplink access signal |
| --- | --- |
| Data information CRC scrambling bit sequence 0 | Time-domain position 0 of uplink access signal |
| Data information CRC scrambling bit sequence 1 | Time-domain position 1 of uplink access signal |
| ... | ... |
| Data information CRC scrambling bit sequence N − 1 | Time-domain position N − 1 of uplink access signal |

Sub-Embodiment 6

It is supposed that the base station and the terminal predefine N time-domain positions of uplink access signals. Or, the base station configures the N time-domain positions of the uplink access signals to the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

Figure 10:
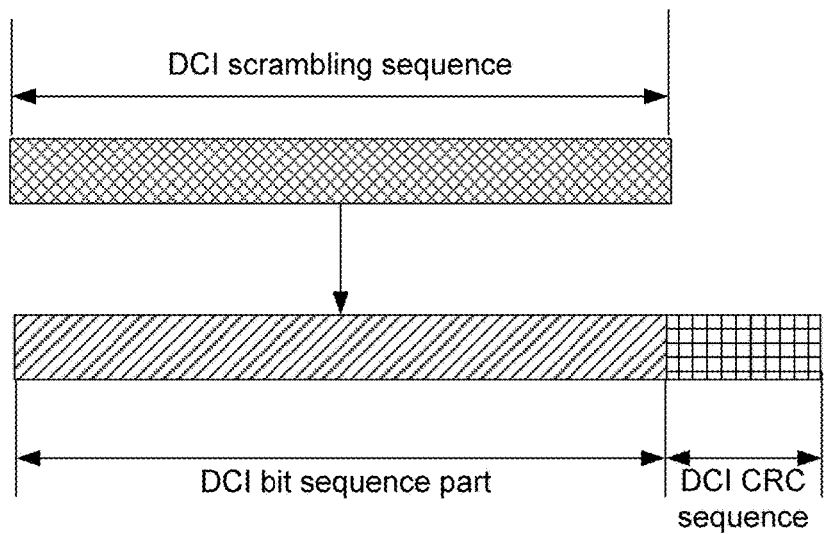
FIG. 10 is a diagram of indicating an uplink beam index or an index of related information of an uplink access signal using a scrambled Cyclic Redundancy Check (CRC) bit sequence of control information according to an embodiment of the present disclosure.
Figure 11:
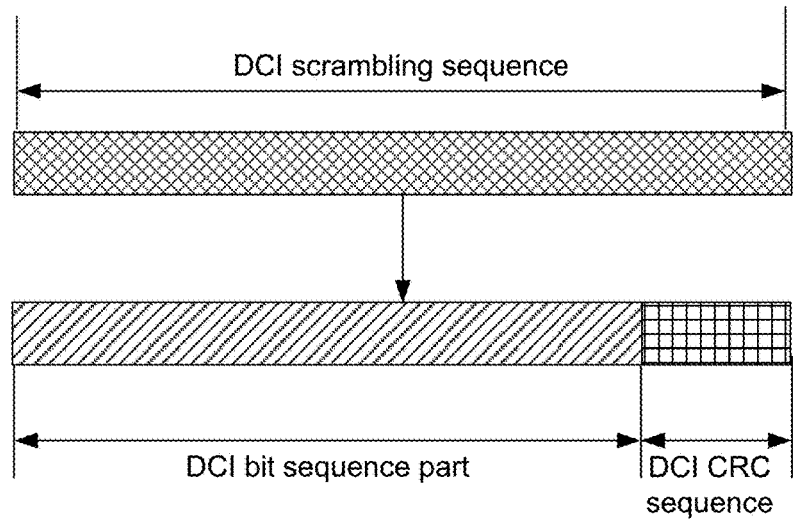
FIG. 11 is a diagram of indicating an uplink beam index or an index of related information of an uplink access signal using a scrambled bit sequence of control information according to an embodiment of the present disclosure.

The base station detects the uplink access signals at multiple time-domain positions of uplink access signals, and after the base station detects an uplink access signal with optimal quality at time-domain position x (0≤x≤N−1) of the uplink access signal, the base station indicates an index of the time-domain position of the uplink access signal through an access response, so that the terminal may send uplink data and control information to the base station by virtue of the first uplink beam. An indication method is that the base station introduces a data information scrambling bit sequence into data information corresponding to the access response, and as shown in FIG. 10, multiple data information scrambling bits may correspond to multiple time-domain position indexes of uplink access signals and the data information scrambling bits are bit sequences formed by "0" and "1". As shown in Table 6, the terminal detects the data information scrambling bit sequence to obtain the index of the time-domain position of the uplink access signal, thereby obtaining the corresponding optimal uplink beam according to preset information; and therefore, the terminal may send the uplink data and the control information to the base station by virtue of the first uplink beam.

TABLE 6

| Data information scrambling bit sequence | Time-domain position of uplink access signal |
|---|---|
| Data information scrambling bit sequence 0 | Time-domain position 0 of uplink access signal |
| Data information scrambling bit sequence 1 | Time-domain position 1 of uplink access signal |
| ... | ... |
| Data information scrambling bit sequence N − 1 | Time-domain position N − 1 of uplink access signal |

Sub-Embodiment 7

It is supposed that the base station and the terminal predefine N time-domain positions of uplink access signals. Or, the base station configures the N time-domain positions of the uplink access signals to the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the numbers of included time units. Here, the duration levels may also be time-domain repeat levels of the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

The base station detects the uplink access signals at multiple time-domain positions of uplink access signals, and after the base station detects an uplink access signal with optimal quality at time-domain position x (0≤x≤N−1) of the uplink access signal, the base station indicates an index of the time-domain position of the uplink access signal through an access response, so that the terminal may send the uplink data and the control information to the base station by virtue of the first uplink beam. An indication method is that the base station introduces a data information and data information CRC scrambling bit sequence into data information corresponding to the access response, and as shown in FIG. 10, multiple data information and data information CRC scrambling bits may correspond to multiple time-domain position indexes of uplink access signals and the data information and data information CRC scrambling bits are bit sequences formed by "0" and "1". As shown in Table 7, the terminal detects the data information and data information CRC scrambling bit sequence to obtain the index of the time-domain position of the uplink access signal, thereby obtaining the corresponding optimal uplink beam according to preset information; and therefore, the terminal may send the uplink data and the control information to the base station by virtue of the first uplink beam.

TABLE 7

| Data information and data information CRC scrambling bit sequence | Time-domain position of uplink access signal |
|---|---|
| Data information and data information CRC scrambling bit sequence 0 | Time-domain position 0 of uplink access signal |
| Data information and data information CRC scrambling bit sequence 1 | Time-domain position 1 of uplink access signal |
| ... | ... |
| Data information and data information CRC scrambling bit sequence N − 1 | Time-domain position N − 1 of uplink access signal |

Sub-Embodiment 8

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

Figure 12:
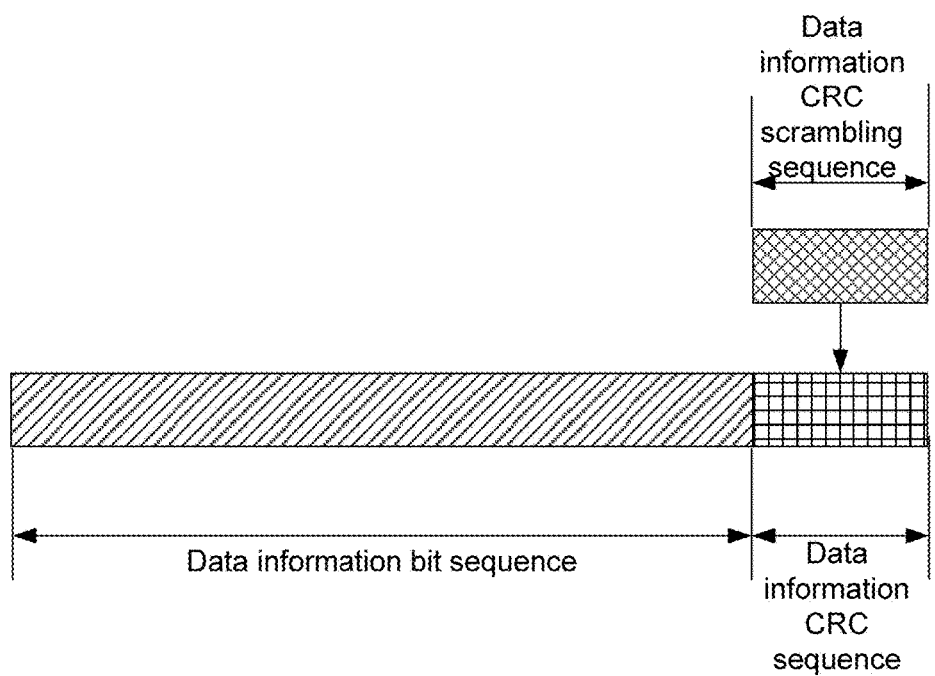
FIG. 12 is a diagram indicating an uplink beam index or an index of related information of an uplink access signal using a scrambled bit sequence of control information and a CRC bit sequence of the control information.
Figure 13:
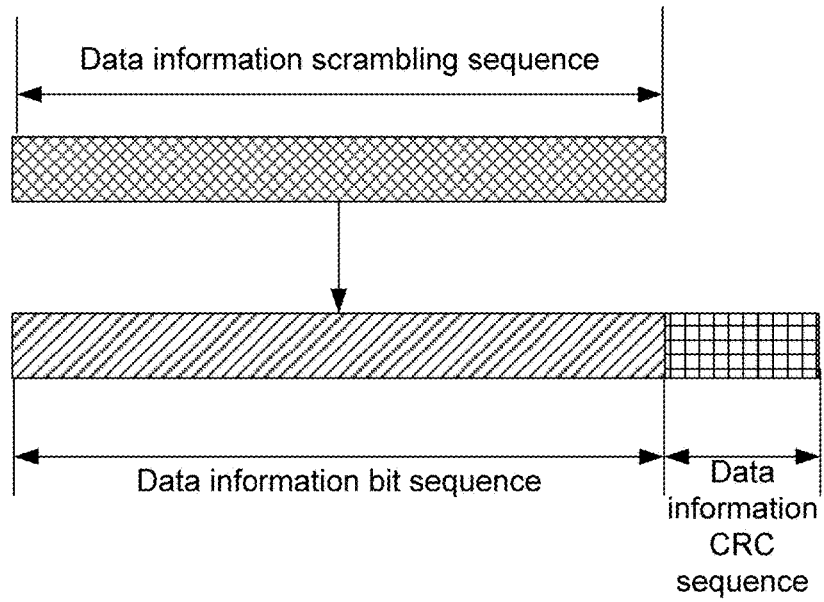
FIG. 13 is a diagram indicating an uplink beam index or an index of related information of an uplink access signal using a scrambled data information CRC bit sequence.
Figure 14:
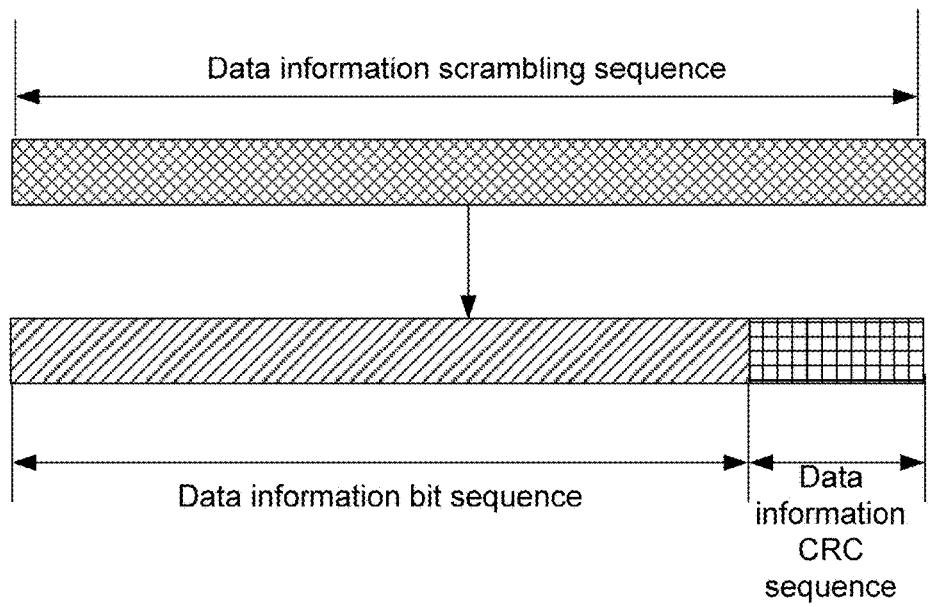
FIG. 14 is a diagram of indicating an uplink beam index or an index of related information of an uplink access signal using a scrambled data information bit sequence.
Figure 15:
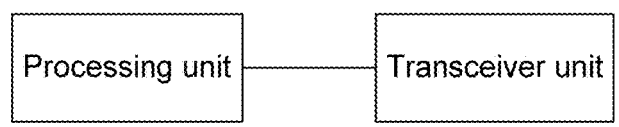
FIG. 15 is a structure diagram of a terminal according to an embodiment of the present disclosure.

The base station detects the uplink access signals at multiple time-domain positions of uplink access signals, and after the base station detects an uplink access signal with optimal quality at time-domain position x (0≤x≤N−1) of the uplink access signal, the base station indicates an index of the time-domain position of the uplink access signal through an access response, so that the terminal may send the uplink data and the control information to the base station by virtue of the first uplink beam. An indication method is that the evolved Node indicates a related information index of the uplink beam through a time-domain and/or frequency-domain position of DCI corresponding to the access response, as shown in FIG. 12. As shown in Table 8, the terminal detects the time-domain and/or frequency-domain position of the DCI corresponding to the access response to obtain the time-domain position of the corresponding uplink access signal, thereby obtaining the optimal uplink beam according to the time-domain position of the uplink access signal; and therefore, the terminal may send the uplink data and the control information to the base station by virtue of the first uplink beam. Here, the time-domain position of the DCI includes indexes of occupied time units and/or the number of occupied time units, and the frequency-domain position of the DCI includes an index of a starting frequency-domain resource occupied by the DCI and/or a width of an occupied frequency-domain resource.

TABLE 8

| Time-domain and/or frequency-domain position of DCI | Time-domain position of uplink access signal |
|---|---|
| Time-domain and/or frequency-domain position 0 of DCI | Time-domain position 0 of uplink access signal |

TABLE 8-continued

| Time-domain and/or frequency-domain position of DCI | Time-domain position of uplink access signal |
|---|---|
| Time-domain and/or frequency-domain position 1 of DCI | Time-domain position 1 of uplink access signal |
| ... | ... |
| Time-domain and/or frequency-domain position N − 1 of DCI | Time-domain position N − 1 of uplink access signal |

Sub-Embodiment 9

It is supposed that the base station and the terminal predefine N time-domain positions of uplink access signals. Or, the base station configures the N time-domain positions of the uplink access signals for the terminal through a system message. The terminal may send uplink access signals by virtue of N uplink beams. The terminal may preset that N uplink beam indexes correspond to the N time-domain positions of the uplink access signals. As shown in Table 1, the time-domain positions of the uplink access signals include indexes of occupied time units and/or duration levels. Here, the duration levels may be reflected by the number of included time units. Here, the duration levels may also be time-domain repeat levels of the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

The base station detects the uplink access signals at multiple time-domain positions of uplink access signals, and after the base station detects an uplink access signal with optimal quality at time-domain position x ($0 \leq x \leq N-1$) of the uplink access signal, the base station indicates an index of the time-domain position of the uplink access signal through an access response, so that the terminal may send the uplink data and the control information to the base station by virtue of the first uplink beam. An indication method is that the base station introduces an indication bit of a time-domain position index of an uplink access signal into data information corresponding to the access response, and a corresponding relationship is shown in Table 9. The terminal detects the indication bit of the time-domain position index of the uplink access signal in the data information to obtain the index of the time-domain position of the corresponding uplink access signal, thereby obtaining the corresponding optimal uplink beam according to preset information; and therefore, the terminal may send the uplink data and the control information to the base station by virtue of the first uplink beam.

TABLE 9

| time-domain position index of uplink access signal is introduced into data information | Time-domain position of uplink access signal |
|---|---|
| index indication 0 of time-domain position of uplink access signal is introduced into data information | Time-domain position 0 of uplink access signal |
| index indication 1 of time-domain position of uplink access signal is introduced into data information | Time-domain position 1 of uplink access signal |
| ... | ... |
| index indication N − 1 time-domain position of uplink access signal is introduced into data information | Time-domain position N − 1 of uplink access signal |

Sub-Embodiment 10

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

TABLE 10

| Uplink beam index | Frequency-domain position of uplink access signal |
|---|---|
| 0 | Frequency-domain position 0 of uplink access signal |
| 1 | Frequency-domain position 1 of uplink access signal |
| ... | ... |
| N − 1 | Frequency-domain position N − 1 of uplink access signal |

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x ($0 \leq x \leq N-1$) of the uplink access signal, the base station indicates an index of the frequency-domain position of the uplink access signal through an access response, so that the terminal may send the uplink data and the control information to the base station by virtue of the first uplink beam. An indication method is that the base station introduces an indication bit of a frequency-domain position index of an uplink access signal into DCI corresponding to the access response, and the terminal detects the indication bit of the frequency-domain position index of the uplink access signal to obtain frequency-domain position index x, indicated by the base station, of the uplink access signal, thereby obtaining the corresponding optimal uplink beam according to preset information; and therefore, the terminal may send the uplink data and the control information to the base station by virtue of the first uplink beam.

Sub-Embodiment 11

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x (0≤x≤N−1) of the uplink access signal, the base station indicates an index of the frequency-domain position of the uplink access signal through an access response, so that the terminal may send the uplink data and the control information to the base station by virtue of the first uplink beam. An indication method is that the base station introduces a DCI CRC scrambling bit sequence into DCI corresponding to the access response, and as shown in FIG. 6, multiple DCI CRC scrambling bits may corresponding to multiple frequency-domain position indexes of uplink access signals and the DCI CRC scrambling bits are bit sequences formed by "0" and "1". As shown in Table 11, the terminal detects the CRC scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 11

| DCI CRC scrambling bit sequence | Frequency-domain position of uplink access signal |
| --- | --- |
| DCI CRC scrambling bit sequence 0 | Frequency-domain position 0 of uplink access signal |
| DCI CRC scrambling bit sequence 1 | Frequency-domain position 1 of uplink access signal |
| ... | ... |
| DCI CRC scrambling bit sequence N − 1 | Frequency-domain position N − 1 of uplink access signal |

Sub-Embodiment 12

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x (0≤x≤N−1) of the uplink access signal, the base station indicates an index of the frequency-domain position of the uplink access signal through an access response, so that the terminal may send uplink data and control information to the base station by virtue of the first uplink beam. An indication method is that the base station introduces a DCI scrambling bit sequence into DCI corresponding to the access response, and as shown in FIG. 7, multiple DCI scrambling bits may correspond to multiple frequency-domain position indexes of uplink access signals and the DCI scrambling bits are bit sequences formed by "0" and "1". As shown in Table 12, the terminal detects the DCI scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 12

| DCI scrambling bit sequence | Frequency-domain position of uplink access signal |
| --- | --- |
| DCI scrambling bit sequence 0 | Frequency-domain position 0 of uplink access signal |
| DCI scrambling bit sequence 1 | Frequency-domain position 1 of uplink access signal |
| ... | ... |
| DCI scrambling bit sequence N − 1 | Frequency-domain position N − 1 of uplink access signal |

Sub-Embodiment 13

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects the downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x (0≤x≤N−1) of the uplink access signal, the base station indicates an index of the frequency-domain position of the uplink access signal through an access response, so that the terminal may send the uplink data and the control information to the base station by virtue of the first uplink beam. An indication method is that the base station introduces a DCI and DCI CRC scrambling bit sequence into DCI corresponding to the access response, and as shown in FIG. 8, multiple DCI and DCI CRC scrambling bits may correspond to multiple frequency-domain position indexes of uplink access signals, and the DCI and DCI CRC scrambling bits are bit sequences formed by "0" and "1". As shown in Table 13, the terminal detects the DCI and DCI CRC scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 13

| DCI and DCI CRC scrambling bit sequence | Frequency-domain position of uplink access signal |
|---|---|
| DCI and DCI CRC scrambling bit sequence 0 | Frequency-domain position 0 of uplink access signal |
| DCI and DCI CRC scrambling bit sequence 1 | Frequency-domain position 1 of uplink access signal |
| ... | ... |
| DCI and DCI CRC scrambling bit sequence N − 1 | Frequency-domain position N − 1 of uplink access signal |

Sub-Embodiment 14

It is supposed that the base station and the terminal predefine N frequency-domain positions of uplink access signals. Or, the base station configures the N frequency-domain positions of the uplink access signals to the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include indexes of occupied time units and/or duration levels. Here, the duration levels may be reflected by the numbers of included time units. Here, the duration levels may also be frequency-domain repeat levels of the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x (0≤x≤N−1) of the uplink access signal, the base station indicates an index of the frequency-domain position of the uplink access signal through an access response, so that the terminal may send the uplink data and the control information to the base station by virtue of the first uplink beam. An indication method is that the base station introduces a data information CRC scrambling bit sequence into data information corresponding to the access response, and as shown in FIG. 9, multiple data information CRC scrambling bits may correspond to multiple frequency-domain position indexes of uplink access signals and the data information CRC scrambling bits are bit sequences formed by "0" and "1". As shown in Table 14, the terminal detects the data information CRC scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 14

| Data information CRC scrambling bit sequence | Frequency-domain position of uplink access signal |
|---|---|
| Data information CRC scrambling bit sequence 0 | Frequency-domain position 0 of uplink access signal |
| Data information CRC scrambling bit sequence 1 | Frequency-domain position 1 of uplink access signal |
| ... | ... |
| Data information CRC scrambling bit sequence N − 1 | Frequency-domain position N − 1 of uplink access signal |

Sub-Embodiment 15

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x (0≤x≤N−1) of the uplink access signal, the base station indicates an index of the frequency-domain position of the uplink access signal through an access response, so that the terminal may send uplink data and control information to the base station by virtue of the first uplink beam. An indication method is that the base station introduces a data information scrambling bit sequence into data information corresponding to the access response, and as shown in FIG. 10, multiple data information scrambling bits may correspond to multiple frequency-domain position indexes of uplink access signals, and the data information scrambling bits are bit sequences formed by "0" and "1". As shown in Table 15, the terminal detects the data information scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 15

| Data information scrambling bit sequence | Frequency-domain position of uplink access signal |
|---|---|
| Data information scrambling bit sequence 0 | Frequency-domain position 0 of uplink access signal |
| Data information scrambling bit sequence 1 | Frequency-domain position 1 of uplink access signal |
| ... | ... |
| Data information scrambling bit sequence N − 1 | Frequency-domain position N − 1 of uplink access signal |

Sub-Embodiment 16

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x ($0 \leq x \leq N-1$) of the uplink access signal, the base station indicates an index of the frequency-domain position of the uplink access signal through an access response, so that the terminal may send uplink data and control information to the base station by virtue of the first uplink beam. An indication method is that the base station introduces a data information and data information CRC scrambling bit sequence into data information corresponding to the access response, and as shown in FIG. 10, multiple data information and data information CRC scrambling bits may correspond to multiple frequency-domain position indexes of uplink access signals and the data information and data information CRC scrambling bits are bit sequences formed by "0" and "1". As shown in Table 16, the terminal detects the data information and data information CRC scrambling bit sequence to obtain the index of the frequency-domain position of the uplink access signal, thereby obtaining the corresponding optimal uplink beam according to preset information; and therefore, the terminal may send the uplink data and the control information to the base station by virtue of the first uplink beam.

TABLE 16

| Data information and data information CRC scrambling bit sequence | Frequency-domain position of uplink access signal |
|---|---|
| Data information and data information CRC scrambling bit sequence 0 | Frequency-domain position 0 of uplink access signal |
| Data information and data information CRC scrambling bit sequence 1 | Frequency-domain position 1 of uplink access signal |
| ... | ... |
| Data information and data information CRC scrambling bit sequence N − 1 | Frequency-domain position N − 1 of uplink access signal |

Sub-Embodiment 17

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x ($0 \leq x \leq N-1$) of the uplink access signal, the base station indicates an index of the frequency-domain position of the uplink access signal through an access response, so that the terminal may send the uplink data and the control information to the base station by virtue of the first uplink beam. An indication method is that the evolved Node indicates a related information index of the uplink beam through a time-domain and/or frequency-domain position of DCI corresponding to the access response, as shown in Table 17. The terminal detects the time-domain and/or frequency-domain position of the DCI corresponding to the access response to obtain the frequency-domain position of the corresponding uplink access signal, thereby obtaining the optimal uplink beam according to the frequency-domain position of the uplink access signal; and therefore, the terminal may send the uplink data and the control information to the base station by virtue of the first uplink beam. Here, the time-domain position of the DCI includes indexes of occupied time units and/or the number of occupied time units, and the frequency-domain position of the DCI includes an index of a starting frequency-domain resource occupied by the DCI and/or a width of an occupied frequency-domain resource.

TABLE 17

| Time-domain and/or frequency-domain position of DCI | Frequency-domain position of uplink access signal |
|---|---|
| Time-domain and/or frequency-domain position 0 of DCI | Frequency-domain position 0 of uplink access signal |
| Time-domain and/or frequency-domain position 1 of DCI | Frequency-domain position 1 of uplink access signal |
| ... | ... |
| Time-domain and/or frequency-domain position N − 1 of DCI | Frequency-domain position N − 1 of uplink access signal |

Sub-Embodiment 18

It is supposed that the base station and the terminal predefine N frequency-domain positions of uplink access signals. Or, the base station configures the N frequency-domain positions of the uplink access signals for the terminal through a system message. The terminal may send uplink access signals by virtue of N uplink beams. The terminal may preset that N uplink beam indexes correspond to the N frequency-domain positions of the uplink access signals. As shown in Table 10, the frequency-domain positions of the uplink access signals include starting frequency-domain positions of the uplink access signals and/or bandwidths occupied by the uplink access signals.

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals.

The base station detects the uplink access signals at multiple frequency-domain positions of uplink access signals, and after the base station detects an uplink access signal with optimal quality at frequency-domain position x ($0 \leq x \leq N-1$) of the uplink access signal, the base station indicates an index of the frequency-domain position of the uplink access signal through an access response, so that the terminal may send the uplink data and the control information to the base station by virtue of the first uplink beam. An indication method is that the base station introduces an index indication bit of a frequency-domain position of an uplink access signal into data information corresponding to the access response, and a corresponding relationship is shown in Table 18. The terminal detects the index indication bit of the frequency-domain position of the uplink access signal in the data information to obtain the index of the frequency-domain position of the corresponding uplink access signal, thereby obtaining the corresponding optimal uplink beam according to preset information; and therefore, the terminal may send the uplink data and the control information to the base station by virtue of the first uplink beam.

TABLE 18

| index indication of frequency-domain position of uplink access signal | Frequency-domain position of uplink access signal |
|---|---|
| index indication 0 of frequency-domain position of uplink access signal | Frequency-domain position 0 of uplink access signal |
| index indication 1 of frequency-domain position of uplink access signal | Frequency-domain position 1 of uplink access signal |
| ... | ... |
| index indication N − 1 of frequency-domain position of uplink access signal | Frequency-domain position N − 1 of uplink access signal |

Sub-Embodiment 19

It is supposed that the base station and the terminal predefine N sequence sets of uplink access signals. Or, the base station configures the N sequence sets of the uplink access signals to the terminal through a system message. The terminal may send uplink access signals by virtue of N uplink beams. The terminal may preset that N uplink beam indexes correspond to the N sequence sets of the uplink access signals. As shown in Table 19.

TABLE 19

| Uplink beam index | Sequence set of uplink access signal |
|---|---|
| 0 | Sequence set 0 of uplink access signal |
| 1 | Sequence set 1 of uplink access signal |
| ... | ... |
| N − 1 | Sequence set N − 1 of uplink access signal |

The terminal detects downlink signals to obtain an index of a first downlink beam, and feeds back the index of the downlink beam by virtue of uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces an indication bit of a sequence set index of an uplink access signal into DCI corresponding to the access response, and the terminal detects the indication bit of the sequence set index of the uplink access signal to obtain sequence set index x, indicated by the base station, of the uplink access signal, thereby obtaining the corresponding optimal uplink beam according to preset information; and therefore, the terminal may send the uplink data and the control information to the base station by virtue of the first uplink beam.

Sub-Embodiment 20

It is supposed that the base station and the terminal predefine N sequence sets of uplink access signals. Or, the base station configures the N sequence sets of the uplink access signals to the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a CRC scrambling bit sequence into DCI corresponding to the access response, and as shown in FIG. 6, multiple DCI CRC scrambling bits may correspond to multiple sequence set indexes of uplink access signals and the DCI CRC scrambling bits are bit sequences formed by "0" and "1". As shown in Table 20, the terminal detects the DCI CRC scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 20

| DCI CRC scrambling bit sequence | Sequence set of uplink access signal |
|---|---|
| DCI CRC scrambling bit sequence 0 | Sequence set 0 of uplink access signal |
| DCI CRC scrambling bit sequence 1 | Sequence set 1 of uplink access signal |
| ... | ... |
| DCI CRC scrambling bit sequence N − 1 | Sequence set N − 1 of uplink access signal |

Sub-Embodiment 21

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for an uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a DCI scrambling bit sequence into DCI corresponding to the access response, and as shown in FIG. 7, multiple DCI scrambling bits may correspond to indexes of multiple sequence sets of uplink access signals, and the DCI scrambling bits are bit sequences formed by "0" and "1". As shown in Table 21, the terminal detects the DCI scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 21

| DCI scrambling bit sequence | Sequence set of uplink access signal |
|---|---|
| DCI scrambling bit sequence 0 | Sequence set 0 of uplink access signal |
| DCI scrambling bit sequence 1 | Sequence set 1 of uplink access signal |
| ... | ... |
| DCI scrambling bit sequence N − 1 | Sequence set N − 1 of uplink access signal |

Sub-Embodiment 22

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a DCI and DCI CRC scrambling bit sequence into DCI corresponding to the access response, and as shown in FIG. 8, multiple DCI and DCI CRC scrambling bits may correspond to multiple sequence set indexes of uplink access signals, and the DCI and DCI CRC scrambling bits are bit sequences formed by "0" and "1". As shown in Table 22, the terminal detects the DCI and DCI CRC scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 22

| DCI and DCI CRC scrambling bit sequence | Sequence set of uplink access signal |
|---|---|
| DCI and DCI CRC scrambling bit sequence 0 | Sequence set 0 of uplink access signal |
| DCI and DCI CRC scrambling bit sequence 1 | Sequence set 1 of uplink access signal |
| ... | ... |
| DCI and DCI CRC scrambling bit sequence N − 1 | Sequence set N − 1 of uplink access signal |

Sub-Embodiment 23

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the one or more uplink access signals by virtue of multiple uplink beams to ensure that the base station may correctly receive the uplink access signals, and the sequences of the uplink access signals corresponding to the multiple beams may be sequences coming from different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a data information CRC scrambling bit sequence into data information corresponding to the access response, and as shown in FIG. 9, multiple data information CRC scrambling bits may correspond to indexes of multiple sequence sets of uplink access signals and the data information CRC scrambling bits are bit sequences formed by "0" and "1". As shown in Table 23, the terminal detects the data information CRC scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 23

| Data information CRC scrambling bit sequence | Sequence set of uplink access signal |
|---|---|
| Data information CRC scrambling bit sequence 0 | Sequence set 0 of uplink access signal |
| Data information CRC scrambling bit sequence 1 | Sequence set 1 of uplink access signal |
| ... | ... |
| Data information CRC scrambling bit sequence N − 1 | Sequence set N − 1 of uplink access signal |

Sub-Embodiment 24

It is supposed that the base station and the terminal predefine N sequence sets of uplink access signals. Or, the base station configures the N sequence sets of the uplink access signals to the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a data information scrambling bit sequence into data information corresponding to the access response, and as shown in Table 24, multiple data information scrambling bits may correspond to indexes of multiple sequence sets of uplink access signals, and the data information scrambling bits are bit sequences formed by "0" and "1". The terminal detects the data information scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 24

| Data information scrambling bit sequence | Sequence set of uplink access signal |
|---|---|
| Data information scrambling bit sequence 0 | Sequence set 0 of uplink access signal |
| Data information scrambling bit sequence 1 | Sequence set 1 of uplink access signal |
| ... | ... |
| Data information scrambling bit sequence N − 1 | Sequence set N − 1 of uplink access signal |

Sub-Embodiment 25

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x ($0 \leq x \leq N-1$) of the uplink access signal, the base station indicates an index of the sequence set of the uplink access signal through an access response, so that the terminal may send uplink data and control information to the base station by virtue of the first uplink beam. An indication method is that the base station introduces a data information and data information CRC scrambling bit sequence into data information corresponding to the access response, and as shown in FIG. 10, multiple data information and data information CRC scrambling bits may correspond to indexes of multiple sequence sets of uplink access signals, and the data information and data information CRC scrambling bits are bit sequences formed by "0" and "1". As shown in Table 25, the terminal detects the data information and data information CRC scrambling bit sequence to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 25

| Data information and data information CRC scrambling bit sequence | Sequence set of uplink access signal |
|---|---|
| Data information and data information CRC scrambling bit sequence 0 | Sequence set 0 of uplink access signal |
| Data information and data information CRC scrambling bit sequence 1 | Sequence set 1 of uplink access signal |
| ... | ... |
| Data information and data information CRC scrambling bit sequence N – 1 | Sequence set N – 1 of uplink access signal |

Sub-Embodiment 26

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for the uplink access signal with optimal quality belongs to sequence set x (0≤x≤N−1) of the uplink access signal, the base station indicates an index of the sequence set of the uplink access signal through an access response, so that the terminal may send uplink data and control information to the base station by virtue of the first uplink beam. An indication method is that the base station indicates the index of the sequence set of the uplink access signal through a time-domain and/or frequency-domain position of DCI corresponding to the access response, as shown in Table 26. The terminal detects the time-domain and/or frequency-domain position of the DCI corresponding to the access response to obtain the index of the sequence set of the uplink access signal, thereby obtaining the corresponding optimal uplink beam according to preset information; and therefore, the terminal may send the uplink data and the control information to the base station by virtue of the first uplink beam. Here, the time-domain position of the DCI includes indexes of occupied time units and/or the number of occupied time units, and the frequency-domain position of the DCI includes an index of a starting frequency-domain resource occupied by the DCI and/or a width of an occupied frequency-domain resource.

TABLE 26

| Time-domain and/or frequency-domain position of DCI | Sequence set of uplink access signal |
|---|---|
| Time-domain and/or frequency-domain position 0 of DCI | Sequence set 0 of uplink access signal |
| Time-domain and/or frequency-domain position 1 of DCI | Sequence set 1 of uplink access signal |
| ... | ... |
| Time-domain and/or frequency-domain position N – 1 of DCI | Sequence set N – 1 of uplink access signal |

Sub-Embodiment 27

It is supposed that the base station and the terminal predefine N sequence sets of uplink access signals. Or, the base station configures the N sequence sets of the uplink access signals for the terminal through a system message. The terminal may send uplink access signals by virtue of N uplink beams. The terminal may preset that N uplink beam indexes correspond to the N sequence sets of the uplink access signals. As shown in Table 19.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and after the base station detects that a sequence adopted for an uplink access signal with optimal quality belongs to sequence set x (0≤x≤N−1) of the uplink access signal, the base station indicates an index of the sequence set of the uplink access signal through an access response, so that the terminal may send uplink data and control information to the base station by virtue of the first uplink beam. An indication method is that the base station introduces an index indication bit of a sequence set of an uplink access signal into data information corresponding to the access response, as shown in Table 27. The terminal detects the index indication bit of the sequence set of the uplink access signal to obtain the index of the sequence set of the uplink access signal, thereby obtaining the corresponding optimal uplink beam according to preset information; and therefore, the terminal may send the uplink data and the control information to the base station by virtue of the first uplink beam.

TABLE 27

| index indication of sequence set of uplink access signal | Sequence set of uplink access signal |
|---|---|
| index indication 0 of sequence set of uplink access signal | Sequence set 0 of uplink access signal |
| index indication 1 of sequence set of uplink access signal | Sequence set 1 of uplink access signal |
| ... | ... |
| ndex indication N – 1 of sequence set of uplink access signal | Sequence set N – 1 of uplink access signal |

Sub-Embodiment 28

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

TABLE 28

| Uplink beam index | Related information of uplink access signal |
|---|---|
| 0 | Related information 0 of uplink access signal |
| 1 | Related information 1 of uplink access signal |
| ... | ... |
| N − 1 | Related information N − 1 of uplink access signal |

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send uplink data and control information to the base station by virtue of the first uplink beam. An indication method is that the base station introduces an index indication bit of related information of the uplink access signal into DCI corresponding to the access response, and the terminal detects the index indication bit of related information of the uplink access signal to obtain related information index x, indicated by the base station, of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

Sub-Embodiment 29

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send uplink data and control information to the base station by virtue of the first uplink beam. An indication method is that the base station introduces a CRC scrambling bit sequence into DCI corresponding to the access response, and as shown in FIG. 6, multiple DCI CRC scrambling bits may correspond to multiple related information indexes of the uplink access signals, and the DCI CRC scrambling bits are bit sequences formed by "0" and "1". As shown in Table 29, the terminal detects the DCI CRC scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 29

| DCI CRC scrambling bit sequence | Related information of uplink access signal |
|---|---|
| DCI CRC scrambling bit sequence 0 | Related information 0 of uplink access signal |
| DCI CRC scrambling bit sequence 1 | Related information 1 of uplink access signal |
| ... | ... |
| DCI CRC scrambling bit sequence N − 1 | Related information N − 1 of uplink access signal |

Sub-Embodiment 30

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send uplink data and control information to the base station by virtue of the first uplink beam. An indication method is that the base station introduces a DCI scrambling bit sequence into DCI corresponding to the access response, and as shown in FIG. 7, multiple DCI scrambling bits may correspond to multiple indexes of related information of the uplink access signals, and the DCI scrambling bits are bit sequences formed by "0" and "1". As shown in Table 30, the terminal detects the DCI scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 30

| DCI scrambling bit sequence | Related information of uplink access signal |
| --- | --- |
| DCI scrambling bit sequence 0 | Related information 0 of uplink access signal |
| DCI scrambling bit sequence 1 | Related information 1 of uplink access signal |
| ... | ... |
| DCI scrambling bit sequence N − 1 | Related information N − 1 of uplink access signal |

Sub-Embodiment 31

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send uplink data and control information to the base station by virtue of the first uplink beam. An indication method is that the base station introduces a DCI and DCI CRC scrambling bit sequence into DCI corresponding to the access response, and as shown in FIG. 8, multiple DCI and DCI CRC scrambling bits may correspond to multiple related information indexes of the uplink access signals and the DCI and DCI CRC scrambling bits are bit sequences formed by "0" and "1". As shown in Table 32, the terminal detects the DCI and DCI CRC scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 32

| DCI and DCI CRC scrambling bit sequence | Related information of uplink access signal |
| --- | --- |
| DCI and DCI CRC scrambling bit sequence 0 | Related information 0 of uplink access signal |
| DCI and DCI CRC scrambling bit sequence 1 | Related information 1 of uplink access signal |
| ... | ... |
| DCI and DCI CRC scrambling bit sequence N − 1 | Related information N − 1 of uplink access signal |

Sub-Embodiment 33

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x ($0 \leq x \leq N-1$) of the uplink access signal, the base station indicates an index of the related information of the uplink access signal through an access response, so that the terminal may send the uplink data and the control information to the base station by virtue of the first uplink beam. An indication method is that the base station introduces a data information CRC scrambling bit sequence into data information corresponding to the access response, and as shown in FIG. 9, multiple data information CRC scrambling bits may correspond to multiple indexes of related information of the uplink access signals, and the data information CRC scrambling bits are bit sequences formed by "0" and "1". As shown in Table 33, the terminal detects the data information CRC scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 33

| Data information CRC scrambling bit sequence | Related information of uplink access signal |
| --- | --- |
| Data information CRC scrambling bit sequence 0 | Related information 0 of uplink access signal |
| Data information CRC scrambling bit sequence 1 | Related information 1 of uplink access signal |
| ... | ... |
| Data information CRC scrambling bit sequence N − 1 | Related information N − 1 of uplink access signal |

Sub-Embodiment 34

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here, the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x ($0 \leq x \leq N-1$) of the uplink access signal, the base station indicates an index of the related information of the uplink access signal through an access response, so that the terminal may send the uplink data and the control information to the base station by virtue of the first uplink beam. An indication method is that the base station introduces a data information scrambling bit sequence into data information corresponding to the access response, and as shown in Table 34, multiple data information scrambling bits may correspond to multiple related information indexes of the uplink access signals, and the data information scrambling bits are bit sequences formed by "0" and "1". As shown in Table 34, the terminal detects the data information scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 34

| Data information scrambling bit sequence | Related information of uplink access signal |
| --- | --- |
| Data information scrambling bit sequence 0 | Related information 0 of uplink access signal |
| Data information scrambling bit sequence 1 | Related information 1 of uplink access signal |
| ... | ... |
| Data information scrambling bit sequence N − 1 | Related information N − 1 of uplink access signal |

Sub-Embodiment 35

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals to the terminal through a system message. Here the S sequence sets of the one or more uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send the uplink data and the control information to the base station by virtue of the first uplink beam. An indication method is that the base station introduces a data information and CRC scrambling bit sequence into data information corresponding to the access response, and as shown in FIG. 10, multiple data information and CRC scrambling bits may correspond to multiple indexes of related information of the uplink access signals, and the data information and CRC scrambling bits are bit sequences formed by "0" and "1". As shown in Table 35, the terminal detects the data information and CRC scrambling bit sequence to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 35

| Data information and data information CRC scrambling bit sequence | Related information of uplink access signal |
| --- | --- |
| Data information and data information CRC scrambling bit sequence 0 | Related information 0 of uplink access signal |
| Data information and data information CRC scrambling bit sequence 1 | Related information 1 of uplink access signal |
| . . . | . . . |
| Data information and data information CRC scrambling bit sequence N − 1 | Related information N − 1 of uplink access signal |

Sub-Embodiment 36

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals to the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send the uplink data and the control information to the base station by virtue of the first uplink beam. An indication method is that the base station indicates the index of the related information of the uplink access signal through a time-domain and/or frequency-domain position of DCI corresponding to the access response, as shown in Table 36 The terminal detects the time-domain and/or frequency-domain position of the DCI corresponding to the access response to obtain the index of the related information of the uplink access signal, thereby obtaining the corresponding optimal uplink beam according to preset information; and therefore, the terminal may send the uplink data and the control information to the base station by virtue of the first uplink beam. Here, the time-domain position of the DCI includes indexes of occupied time units and/or the number of occupied time units, and the frequency-domain position of the DCI includes an index of a starting frequency-domain resource occupied by the DCI and/or a width of an occupied frequency-domain resource. Here, the related information may include: beam indexes of the uplink access signals.

TABLE 36

| Time-domain and/or frequency-domain position of DCI | Related information of uplink access signal |
| --- | --- |
| Time-domain and/or frequency-domain position 0 of DCI | Related information 0 of uplink access signal |
| Time-domain and/or frequency-domain position 1 of DCI | Related information 1 of uplink access signal |
| . . . | . . . |
| Time-domain and/or frequency-domain position N − 1 of DCI | Related information N − 1 of uplink access signal |

Sub-Embodiment 37

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x ($0 \leq x \leq N-1$) of the uplink access signal, the base station indicates an index of the related information of the uplink access signal through an access response, so that the terminal may send uplink data and control information to the base station by virtue of the first uplink beam. An indication method is that the base station introduces an index indication bit of related information of the uplink access signal into data information corresponding to the access response, as shown in Table 37. The terminal detects the index indication bit of related information of the uplink access signal to obtain the index of the related information of the uplink access signal, thereby obtaining the corresponding optimal uplink beam according to preset information; and therefore, the terminal may send the uplink data and the control information to the base station by virtue of the first uplink beam. Here, the related information may include: beam indexes of the uplink access signals.

TABLE 37

| Index indication of related information of the uplink access signal | Related information of uplink access signal |
|---|---|
| Index indication 0 of related information of the uplink access signal | Related information 0 of uplink access signal |
| Index indication 1 of related information of the uplink access signal | Related information 1 of uplink access signal |
| ... | ... |
| Index indication N − 1 of related information of the uplink access signal | Related information N − 1 of uplink access signal |

Sub-Embodiment 38

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The terminal may preset that N uplink beam indexes correspond to the N pieces of related information of the uplink access signals. As shown in Table 28.

The terminal detects the downlink signals to obtain an index of a first downlink beam, and feeds back the index of the downlink beam by virtue of the one or more uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x ($0 \leq x \leq N-1$) of the uplink access signal, the base station indicates an index of the related information of the uplink access signal through an access response, so that the terminal may send the uplink data and the control information to the base station by virtue of the first uplink beam. An indication method is that the base station introduces an index indication bit of related information of the uplink access signal into data information corresponding to the access response and introduces a DCI CRC scrambling bit sequence into DCI corresponding to the access response, as shown in Table 38. The terminal detects the index indication bit of related information of the uplink access signal and the DCI CRC scrambling bit sequence introduced into the DCI corresponding to the access response to obtain the index of the related information of the uplink access signal, thereby obtaining the corresponding optimal uplink beam according to preset information; and therefore, the terminal may send the uplink data and the control information to the base station by virtue of the first uplink beam. Here NS−1 is a maximum value of an index indication of related information of the uplink access signal, and NR is the number of DCI CRC scrambling bit sequences. Here, the related information may include: beam indexes of the uplink access signals.

TABLE 38

| Index indication of related information of uplink access signal | Related information of uplink access signal |
|---|---|
| Index indication 0 of related information of uplink access signal, and DCI CRC scrambling bit sequence 0 | Related information 0 of uplink access signal |
| Index indication 0 of related information of uplink access signal, and DCI CRC scrambling bit sequence 1 | Related information 1 of uplink access signal |
| ... | ... |
| Index indication NS − 1 of related information of the uplink access signal, and DCI CRC scrambling bit sequence NR − 1 | Related information N − 1 of uplink access signal |

Therefore, during a practical application, various kinds of related information of uplink access signals may be freely combined, methods for the base station to notify the terminal of corresponding indexes of the related information of the uplink access signals may also be freely combined, so as to implement notification and consistent understanding, and various freely combined solutions all shall fall within the scope of protection of embodiment 1.

Embodiment 5

It is supposed that a base station send downlink synchronization signals and/or downlink system information by virtue of N downlink beams, a terminal detects the downlink synchronization signals and/or downlink system information sent through each beam, the terminal may obtain the synchronization signal and/or downlink system information sent by a first downlink beam, and the terminal feeds back an index corresponding to the optimal downlink beam through at least one uplink access signal.

The terminal is needed to send the at least one uplink access signal by virtue of one or more uplink beams to ensure that the base station can correctly receive at least one uplink access signal sent by at least one uplink beam as much as possible. The terminal enables the at least one uplink access signal sent through different uplink beams to be identified by at least one of the following characteristics of the at least one uplink access signal. The characteristics of the at least one uplink access signal include at least one of:

1. at least one time-domain position of the at least one uplink access signal;
2. at least one frequency-domain position of the at least one uplink access signal;
3. at least one available sequence of the at least one uplink access signal;
4. at least one uplink-beam-index indication bit after the at least one uplink access signal; and
5. at least one beam identification sequence after the at least one uplink access signal.

The base station detects a first uplink access signal defined according to a certain criterion from the at least one uplink access signal received from the terminal, and then obtains the index of related information of the at least one uplink access signal.

Related information of the at least one uplink access signal includes:

1. the time-domain position of the detected first uplink access signal defined according to the certain criterion;
2. the frequency-domain position of the detected first uplink access signal defined according to the certain criterion;
3. the sequence of the detected first uplink access signal defined according to the certain criterion;
4. the uplink-beam-index indication bit contained after the detected first uplink access signal defined according to the certain criterion; and
5. the beam identification sequence contained after the detected first uplink access signal defined according to the certain criterion.

After obtaining the index of related information corresponding to the first uplink access signal defined according to the certain criterion, the base station finds a corresponding uplink beam index according to a correspondence, predefined by the base station and the terminal, between an index of related information of an uplink access signal and an uplink beam index, or, according to a correspondence, configured for the terminal by the base station through a system message, between an index of related information of an uplink access signal and an uplink beam index. The uplink beam index corresponding to the first uplink access signal is indicated to the terminal through an access response in at least one of the following manners:

1. an uplink beam index is introduced into DCI corresponding to the access response;
2. an indication bit of an uplink beam index is introduced into DCI corresponding to the access response;
3. a DCI CRC bit sequence is scrambled by virtue of a DCI CRC scrambling sequence corresponding to an index bit;
4. DCI is scrambled by virtue of a DCI scrambling sequence corresponding to an uplink beam index bit;
5. DCI and a DCI CRC bit sequence are scrambled by virtue of a DCI and DCI CRC scrambling sequence corresponding to an uplink beam index bit;
6. a CRC of data information bits is scrambled by virtue of a data information CRC scrambling sequence corresponding to an uplink beam index bit;
7. data information is scrambled by virtue of a data information scrambling sequence corresponding to an uplink beam index bit;
8. data information and a CRC bit sequence of the data information are scrambled by virtue of data information and a data information CRC scrambling sequence corresponding to an uplink beam index bit;
9. a bit is added into data information to indicate a corresponding index; and
10. a time-domain and/or frequency-domain resource where DCI is located is adopted.

The terminal obtains an optimal uplink beam index indicated by the base station correspondingly in at least of the following detection manners.

The detection manners include that:

1. an uplink beam index in DCI corresponding to the access response is detected;
2. an uplink-beam-index indication bit in DCI corresponding to the access response is detected;
3. a DCI CRC scrambling sequence in DCI corresponding to the access response is detected;
4. a DCI scrambling sequence corresponding to the access response is detected;
5. a DCI and DCI CRC scrambling sequence corresponding to the access response is detected;
6. a CRC scrambling sequence of data information corresponding to the access response is detected;
7. a scrambling sequence of data information corresponding to the access response is detected;
7. a data information and data information CRC scrambling sequence corresponding to the access response is detected;
8. a data information bit corresponding to the access response is detected; and
9. a time-domain and/or frequency-domain resource where DCI is located is detected.

After obtaining the index of the optimal uplink beam indicated by the base station, the terminal may send uplink data and control information to the base station by virtue of the first uplink beam.

The base station configures a corresponding relationship between uplink access signal related information and an uplink beam index to the terminal through a system message, as shown in Table 39.

TABLE 39

| Uplink access signal related information | Uplink beam index |
|---|---|
| Uplink access signal related information 0 | Uplink beam index 0 |
| Uplink access signal related information 1 | Uplink beam index 1 |
| . . . | . . . |
| Uplink access signal related information N − 2 | Uplink beam index N − 2 |
| Uplink access signal related information N − 1 | Uplink beam index N − 1 |

Sub-Embodiment 1

Sub-embodiments 1-38 of embodiment 4 may all be applied to this embodiment, and the difference is that: in the sub-embodiments of embodiment 4, the terminal may preset a correspondence between N uplink beam indexes and the N pieces of related information of uplink access signals, while in the sub-embodiments of this embodiment, the base station and the terminal may predefine that N uplink beam indexes correspond to N pieces of related information of uplink access signals, or the base station notifies the terminal of a corresponding relationship between the N uplink beam indexes and the N pieces of related information of the uplink access signals through a system message. In addition, after obtaining related information of an uplink access signal, the base station does not feed back an index of the related information of the uplink access signal, but finds an uplink beam index according to the corresponding relationship between related information of an uplink access signal and an uplink beam index, and then the base station indicates the uplink beam index to the terminal.

Sub-Embodiment 2

It is supposed that the base station and the terminal predefine S sequence sets of uplink access signals, X time-domain positions of uplink access signals and Y frequency-domain positions of uplink access signals. Or, the base station configures the S sequence sets of the uplink access signals, the X time-domain positions of the uplink access signals and the Y frequency-domain positions of the uplink access signals for the terminal through a system message. Here the S sequence sets of the uplink access signals, the X time-domain positions of the uplink access signals and the Y frequency-domain positions of the uplink access signals form N (N=S*X*Y) pieces of related information of the uplink access signals. The terminal may send uplink access signals by virtue of N uplink beams. The base station and the terminal may predefine that N uplink beam indexes correspond to the N pieces of related information of the uplink access signals, or the base station notifies the terminal of a corresponding relationship between the N uplink beam indexes and the N pieces of related information of the uplink access signals through a system message. As shown in Table 39.

The terminal detects downlink signals to obtain an index of a first downlink beam, and feeds back the index of the downlink beam by virtue of the uplink access signals. The terminal is needed to send the uplink access signals by virtue of multiple uplink beams to ensure that the base station may correctly receive the uplink access signals, and the sequences of the uplink access signals corresponding to the multiple beams may adopt sequences in different uplink access signal sets.

The base station detects the uplink access signals at multiple time-domain and/or frequency-domain positions of uplink access signals, and when the base station detects that related information of the uplink access signal adopted for the uplink access signal with optimal quality belongs to related information x (0≤x≤N−1) of the uplink access signal, the base station indicates an index of the related information of the uplink access signal through an access response, so that the terminal may send uplink data and control information to the base station by virtue of the first uplink beam. An indication method is that the base station introduces an indication bit of an uplink beam index of the uplink access signal into data information corresponding to the access response and introduces a DCI CRC scrambling bit sequence into DCI corresponding to the access response, as shown in Table 40. The terminal detects the indication bit of the uplink beam index of the uplink access signal and the DCI CRC scrambling bit sequence introduced into the DCI corresponding to the access response to obtain the uplink beam index of the uplink access signal, thereby obtaining the corresponding optimal uplink beam; and therefore, the terminal may send the uplink data and the control information to the base station by virtue of the first uplink beam. Here, NS−1 is a maximum index value of the uplink beam index indication of the uplink access signal and NR is the number of DCI CRC scrambling bit sequences.

TABLE 40

| DCI CRC scrambling bit sequence and uplink beam index indication of uplink access signal | uplink beam index of uplink access signal |
|---|---|
| and DCI CRC scrambling bit sequence 0 and uplink beam index indication 0 of uplink access signal | uplink beam index 0 of uplink access signal |
| DCI CRC scrambling bit sequence 1 and uplink beam index indication 0 of uplink access signal | uplink beam index 1 of uplink access signal |
| ... | ... |
| DCI CRC scrambling bit sequence NR − 1 and uplink beam index indication NS − 1 of uplink access signal | uplink beam index N − 1 of uplink access signal |

Therefore, during a practical application, various kinds of related information of the uplink access signals may be freely combined, methods for the base station to notify the terminal of the corresponding indexes of the related information of the uplink access signals may also be freely combined to implement notification and consistent understanding, and various freely combined solutions all shall fall within the scope of protection of this embodiment.

Considering that different uplink beams of the terminal may have different transmitting power, the base station may configure that the terminal adopt different transmitting power for different beams to enable the terminal to meet a demand for signal quality by virtue of lower power beams.

In the present disclosure, feedback of a beam index includes feedback of an index of an optimal uplink beam or indexes of multiple pieces of related information of uplink access signals, or feedback of indexes of multiple optima uplink beams or indexes of multiple pieces of related information of uplink access signals.

The solutions of the abovementioned embodiments may be combined in certain manners to generate some combined solutions, and the combinations of the solutions in the present disclosure all fall within the scope of protection of the present disclosure.

There are many methods for the terminal to detecting an optimal sequence in the present disclosure, they are all methods for implementing detection, and for example, a sequence-correlated method is adopted to select a sequence index with the highest correlation value for feedback. Different sequence indexes may be selected according to different criterions, and there are no limits to the inventive idea of the present disclosure. Any detection method shall fall within the scope of protection of the present disclosure as long as one or more optimal values may be calculated and corresponding index values may be obtained.

Embodiment 6

This embodiment provides a base station, which includes: a transceiver unit and a processing unit, wherein the processing unit is configured to detect a first uplink access signal of a terminal from at least one uplink access signal received from the terminal according to a preset rule, acquire corresponding related information from the first uplink access signal and generate an access response indication by virtue of an uplink beam index corresponding to the first uplink access signal; and the transceiver unit is configured to send the access response indication.

The access response indication is generated in at least one of following manners:

the uplink beam index is introduced into DCI corresponding to the access response indication, wherein the uplink beam index is an index corresponding to an uplink beam adopted by the terminal when the at least one uplink access signal is sent;

an indication bit of the uplink beam index is introduced into the DCI corresponding to the access response indication, wherein the uplink beam index is an index corresponding to an uplink beam adopted by the terminal when the at least one uplink access signal is sent;

a CRC bit sequence of DCI is scrambled by virtue of a DCI CRC scrambling sequence corresponding to the uplink beam index;

a DCI bit sequence is scrambled by virtue of a DCI scrambling sequence corresponding to the uplink beam index;

the DCI and the DCI CRC bit sequence are scrambled by virtue of a DCI and DCI CRC scrambling sequence corresponding to the uplink beam index;

a CRC bit sequence of data information is scrambled by virtue of a data information CRC scrambling sequence corresponding to the uplink beam index;

a data information bit sequence is scrambled by virtue of a data information scrambling sequence corresponding to the uplink beam index;

data information and a data information CRC bit sequence are scrambled by virtue of data information and a CRC scrambling sequence of the data information corresponding to the uplink beam index;

a bit used to indicate a corresponding index is added into data information; and a time-domain and/or frequency-domain resource where the DCI is located is adopted.

The related information includes at least one of the following information: a time-domain position index of the first uplink access signal; a frequency-domain position index of the first uplink access signal; a sequence index of the first uplink access signal; an uplink-beam-index indication bit contained after the first uplink access signal; and an index corresponding to a beam identification sequence contained after the first uplink access signal.

The processing unit is further configured to, before detecting the first uplink access signal of the terminal from the at least one uplink access signal received from the terminal, preset configuration information of the at least one uplink access signal;

the configuration information includes at least one of the following information: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one beam identification sequence after the at least one uplink access signal.

The processing unit is further configured to, before detecting the first uplink access signal of the terminal from the at least one uplink access signal received from the terminal, preset configuration information of the at least one uplink access signal;

the configuration information includes at least one of the following information: a corresponding relationship between the at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

The processing unit is further configured to, before detecting the first uplink access signal of the terminal from the at least one uplink access signal received from the terminal, send configuration information of the at least one uplink access signal through a system message;

the configuration information includes at least one of the following information: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one beam identification sequence after the at least one uplink access signal.

The processing unit is further configured to, before detecting the first uplink access signal of the terminal from the at least one uplink access signal received from the terminal, send the configuration information of the at least one uplink access signal through a system message;

the configuration information includes at least one of the following information: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

Embodiment 7

The embodiment of the present disclosure provides a terminal, which includes: a transceiver unit and a processing unit, wherein the transceiver unit is configured to send at least one uplink access signal, the at least one uplink access signal including related information of the at least one uplink access signal, and send a received access response indication to the processing unit; and the processing unit is configured to determine an uplink beam index corresponding to a first uplink access signal selected by a base station according to the received access response indication.

The first uplink access signal selected by the base station is determined according to the received access response indication in at least one of following manners:

the uplink beam index corresponding to the first uplink access signal selected by the base station is determined according to an uplink beam index in DCI corresponding to the access response indication;

the uplink beam index corresponding to the first uplink access signal selected by the base station is determined according to an uplink-beam-index indication bit in DCI corresponding to the access response indication;

the uplink beam index corresponding to the first uplink access signal selected by the base station is determined according to a CRC scrambling sequence of DCI corresponding to the access response indication;

the uplink beam index corresponding to the first uplink access signal selected by the base station is determined according to a scrambling sequence of DCI corresponding to the access response indication;

the uplink beam index corresponding to the first uplink access signal selected by the base station is determined according to a scrambling sequence of DCI CRC and DCI corresponding to the access response indication;

the uplink beam index corresponding to the first uplink access signal selected by the base station is determined according to a CRC scrambling sequence of data information corresponding to the access response indication;

the uplink beam index corresponding to the first uplink access signal selected by the base station is determined according to a scrambling sequence of data information corresponding to the access response indication;

the uplink beam index corresponding to the first uplink access signal selected by the base station is determined according to a scrambling sequence of data information CRC and data information corresponding to the access response indication;

the uplink beam index corresponding to the first uplink access signal selected by the base station is determined according to a data information bit corresponding to the access response indication; and the uplink beam index corresponding to the first uplink access signal selected by the base station is determined according to a time-domain and/or frequency-domain resource where the DCI in the access response indication is located, wherein the uplink beam index is an index corresponding to an uplink beam adopted by the terminal when the at least one uplink access signal is sent.

The related information includes at least one of the following information:

at least one time-domain position index of the at least one uplink access signal;

at least one frequency-domain position index of the at least one uplink access signal;

at least one sequence index of the at least one uplink access signal;

at least one uplink-beam-index indication bit contained after the at least one uplink access signal; and at least one beam identification sequence contained after the at least one uplink access signal.

The processing unit is further configured to preset configuration information of the at least one uplink access signal before the transceiver unit sends the at least one uplink access signal, wherein the configuration information includes at least one of the following information: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one available sequence of at least one beam identification sequence after the at least one uplink access signal.

The processing unit is further configured to preset configuration information of the at least one uplink access signal before the transceiver unit sends the at least one uplink access signal, wherein, the configuration information includes at least one of the following information: a corresponding relationship between the at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

The processing unit is further configured to, before the transceiver unit sends the at least one uplink access signal, receive a system message and extract at least one of the following information from the system message: at least one time-domain position of the at least one uplink access signal; at least one frequency-domain position of the at least one uplink access signal; at least one available sequence of the at least one uplink access signal; at least one uplink-beam-index indication bit after the at least one uplink access signal; and at least one beam identification sequence after the at least one uplink access signal.

The processing unit is further configured to, before the transceiver unit sends the at least one uplink access signal, receive the system message and extract at least one of the following information from the system message: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit after the at least one uplink access signal and at least one uplink beam index; and a corresponding relationship between at least one available sequence of at least one beam identification sequence after the at least one uplink access signal and at least one uplink beam index.

A system for indicating an uplink beam index, provided by the present disclosure, includes a terminal and a base station, wherein the terminal is configured to send one or more uplink access signals to the base station, the one or more uplink access signals including related information of the one or more uplink access signals, and determine an uplink beam index corresponding to a first uplink access signal selected by the base station according to a received access response indication; and the base station is configured to detect the first uplink access signal of the terminal from the at least one uplink access signal received from the terminal according to a preset rule, acquire corresponding related information from the first uplink access signal, generate the access response indication by virtue of an uplink beam index corresponding to the first uplink access signal and send the access response indication.

When being implemented in form of a software function module and sold or used as an independent product, each unit and subunit thereof in the apparatus of the embodiments of the present disclosure may be stored in a computer-readable storage medium. Based on such understanding, the technical solutions of the present disclosure or the parts making contributions to conventional art may be embodied in form of a software product, and the computer software product may be stored in a storage medium, including a plurality of instructions configured to enable computer equipment (which may be a personal computer, a server, network equipment or the like) to execute all or part of the steps of the method of each embodiment. The storage medium includes: various media capable of storing program codes such as a U disk, a mobile hard disk, a Read-Only Memory (ROM), a Random Access Memory (RAM), a magnetic disc or a compact disc. Therefore, the embodiments of the present disclosure may be not limited to any specific hardware and software combination.

Correspondingly, the embodiments of the present disclosure further provide a computer storage medium, in which a computer program is stored, the computer program being configured to execute a method for detecting network coverage condition in the embodiments of the present disclosure.

The above are only the embodiments of the present disclosure and are not intended to limit the scope of protection of the present disclosure.

What is claimed is:

1. A method for indicating an uplink beam index, comprising:
   detecting, by a base station, a first uplink access signal of a terminal from at least one uplink access signal received from the terminal according to a preset rule;
   acquiring, by the base station, corresponding related information from the first uplink access signal, wherein the related information comprises the beam characteristic of the first uplink access signal; and
   generating, by the base station, an access response indication by virtue of an uplink beam index corresponding to the first uplink access signal, and sending the access response indication, wherein an uplink beam to be used by the terminal to transmit control and/or data, is determined by the terminal based on the access response indication,
   wherein before detecting, by the base station, the first uplink access signal of the terminal from the at least one uplink access signal received from the terminal according to the preset rule, the method further comprises:
   presetting, by the base station, configuration information of the at least one uplink access signal, wherein
   the configuration information comprises at least one of following information: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit obtained after the at least one uplink access signal and at least one uplink beam index; and a corresponding relationship between at least one beam identification sequence obtained after the at least one uplink access signal and at least one uplink beam index; or
   wherein before detecting, by the base station, the first uplink access signal of the terminal from the at least one uplink access signal received from the terminal according to the preset rule, the method further comprises:
   sending, by the base station, configuration information of the at least one uplink access signal through a system message, wherein
   the configuration information comprises at least one of following information: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit obtained after the at least one uplink access signal and at least one uplink beam index; and a corresponding relationship between at least one available sequence of at least one beam identification sequence obtained after the at least one uplink access signal and at least one uplink beam index.

2. The method according to claim 1, wherein the access response indication is generated in at least one of following manners:
   introducing the uplink beam index into Downlink Control Information (DCI) corresponding to the access response indication, wherein the uplink beam index is an index corresponding to an uplink beam adopted by the terminal when the at least one uplink access signal is sent;
   introducing an uplink beam index bit into DCI corresponding to the access response indication, wherein the uplink beam index is an index corresponding to an uplink beam adopted by the terminal when the at least one uplink access signal is sent;
   scrambling a DCI Cyclic Redundancy Check (CRC) bit sequence by virtue of a DCI CRC scrambling sequence corresponding to the uplink beam index;
   scrambling a DCI bit sequence by virtue of a DCI scrambling sequence corresponding to the uplink beam index;
   scrambling a DCI bit sequence and a DCI CRC bit sequence by virtue of a DCI and CRC scrambling sequence corresponding to the uplink beam index;
   scrambling a CRC bit sequence of data information by virtue of a CRC scrambling sequence data information corresponding to the uplink beam index;
   scrambling a bit sequence of data information by virtue of a scrambling sequence of the data information corresponding to the uplink beam index;
   scrambling a bit sequence of data information and a CRC bit sequence of the data information by virtue of data information and a CRC scrambling sequence of the data information corresponding to the uplink beam index;
   adding a bit used to indicate a corresponding uplink beam index into data information; and indicating an uplink beam index by virtue of a time-domain and/or frequency-domain resource where DCI corresponding to the uplink beam index is located.

3. The method according to claim 1, wherein the related information comprises at least one of following information: a time-domain position index of the first uplink access signal; a frequency-domain position index of the first uplink access signal; a sequence index of the first uplink access signal; an uplink-beam-index indication bit obtained after the first uplink access signal; and an index corresponding to a beam identification sequence obtained after the first uplink access signal.

4. A base station, comprising: a transceiver unit and a processing unit, wherein
the processing unit is configured to detect a first uplink access signal of a terminal from at least one uplink access signal received from the terminal according to a preset rule, acquire corresponding related information from the first uplink access signal and generate an access response indication by virtue of an uplink beam index corresponding to the first uplink access signal, wherein the related information comprises the beam characteristic of the first uplink access signal; and
the transceiver unit is configured to send the access response indication, wherein an uplink beam to be used by the terminal to transmit control and/or data, is determined by the terminal based on the access response indication,
wherein the processing unit is further configured to, before detecting the first uplink access signal of the terminal from the at least one uplink access signal received from the terminal, preset configuration information of the at least one uplink access signal; wherein the configuration information comprises at least one of following information: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit obtained after the at least one uplink access signal and at least one uplink beam index; and a corresponding relationship between at least one beam identification sequence obtained after the at least one uplink access signal and at least one uplink beam index;
or
wherein the processing unit is further configured to, before detecting the first uplink access signal of the terminal from the at least one uplink access signal received from the terminal, send configuration information of the at least one uplink access signal through a system message; wherein the configuration information comprises at least one of following information: a corresponding relationship between at least one time-domain position of the at least one uplink access signal and at least one uplink beam index; a corresponding relationship between at least one frequency-domain position of the at least one uplink access signal and at least one uplink beam index; a corresponding relationship between at least one available sequence of the at least one uplink access signal and at least one uplink beam index; a corresponding relationship between at least one uplink-beam-index indication bit obtained after the at least one uplink access signal and at least one uplink beam index; and a corresponding relationship between at least one available sequence of at least one beam identification sequence obtained after the at least one uplink access signal and at least one uplink beam index.

5. The base station according to claim 4, wherein the access response indication is generated in at least one of following manners:
introducing the uplink beam index into Downlink Control Information (DCI) corresponding to the access response indication, wherein the uplink beam index is an index corresponding to an uplink beam adopted by the terminal when the at least one uplink access signal is sent;
scrambling a Cyclic Redundancy Check (CRC) bit sequence of DCI by virtue of a CRC scrambling sequence of the DCI corresponding to the uplink beam index;
scrambling a bit sequence of DCI by virtue of a scrambling sequence of the DCI corresponding to the uplink beam index;
scrambling a bit sequence of DCI and a CRC bit sequence of the DCI by virtue of the DCI and a CRC scrambling sequence of the DCI corresponding to the uplink beam index;
scrambling a CRC bit sequence of data information by virtue of a CRC scrambling sequence of the data information corresponding to the uplink beam index;
scrambling a bit sequence of data information by virtue of a scrambling sequence of the data information corresponding to the uplink beam index;
scrambling a bit sequence of data information and a CRC bit sequence of the data information by virtue of data information and a CRC scrambling sequence of the data information corresponding to the uplink beam index;
adding a bit used to indicate an index corresponding to an uplink beam into data information; and
indicating an uplink beam index by virtue of a time-domain and/or frequency-domain resource where DCI corresponding to the uplink beam index is located.

6. The base station according to claim 4, wherein the related information comprises at least one of following information: a time-domain position index of the first uplink access signal; a frequency-domain position index of the first uplink access signal; a sequence index of the first uplink access signal; an uplink-beam-index indication bit obtained after the first uplink access signal; and an index corresponding to a beam identification sequence obtained after the first uplink access signal.

* * * * *